US009424554B2

(12) United States Patent
Hayton et al.

(10) Patent No.: US 9,424,554 B2
(45) Date of Patent: Aug. 23, 2016

(54) ENTERPRISE MANAGED SYSTEMS WITH COLLABORATIVE APPLICATION SUPPORT

(71) Applicant: Citrix Systems, Inc., Fort Lauderdale, FL (US)

(72) Inventors: Richard Hayton, Cambridge (GB); Kevin Batson, Chalfont (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 367 days.

(21) Appl. No.: 13/888,689

(22) Filed: May 7, 2013

(65) Prior Publication Data

US 2013/0297700 A1    Nov. 7, 2013

Related U.S. Application Data

(60) Provisional application No. 61/644,060, filed on May 8, 2012, provisional application No. 61/643,629, filed on May 7, 2012.

(51) Int. Cl.
    *G06F 15/16* (2006.01)
    *G06Q 10/10* (2012.01)

(52) U.S. Cl.
    CPC .................................... *G06Q 10/10* (2013.01)

(58) Field of Classification Search
    USPC ........................................................ 709/204
    See application file for complete search history.

(56) References Cited

U.S. PATENT DOCUMENTS

| 8,468,164 | B1 * | 6/2013 | Paleja ............... G06F 17/30867 707/767 |
| 2009/0276771 | A1 * | 11/2009 | Nickolov ............... G06F 9/4856 717/177 |
| 2010/0146269 | A1 * | 6/2010 | Baskaran ....................... 713/165 |
| 2011/0137991 | A1 * | 6/2011 | Russell .......................... 709/204 |
| 2011/0270721 | A1 * | 11/2011 | Kusterer ........................ 705/32 |
| 2012/0129503 | A1 * | 5/2012 | Lindeman ............. H04W 4/001 455/414.1 |
| 2012/0216122 | A1 * | 8/2012 | Wong et al. .................... 715/738 |
| 2012/0216125 | A1 * | 8/2012 | Pierce ............................ 715/744 |

\* cited by examiner

*Primary Examiner* — Glenford Madamba
(74) *Attorney, Agent, or Firm* — Banner & Witcoff, Ltd.

(57) ABSTRACT

Described herein is an enterprise system including an enterprise social platform associated with an application store platform, which is accessible by a computing device in a secure manner. The enterprise social platform stores information indicating user roles within the enterprise and provides at least one social networking feature to a group of users that are associated based on the roles, where the social networking feature is associated with an enterprise application store. An application catalog system of the enterprise application store platform includes sets of enterprise applications that are available for selection by enterprise users, and the application catalog system provides access to selected enterprise applications. An application store storage system includes a plurality of files associated with each one of the plurality of applications, wherein the plurality of files includes enterprise customized application templates, enterprise application usage information, application evaluation information, application recommendations, or an application support forum. An application store management system presents selected ones of the files to a user within the enterprise social platform based on the user's membership in the group of users.

27 Claims, 13 Drawing Sheets

ENTERPRISE MANAGED SYSTEMS WITH COLLABORATIVE APPLICATION SUPPORT

This application claims the benefit of the following provisional patent applications, which are hereby incorporated by reference in their entirety: U.S. provisional application Ser. Nos. 61/644,060 (filed May 8, 2012) and 61/643,629 (filed May 7, 2012).

The following U.S. Patents are incorporated in their entirety by reference herein: U.S. Pat. No. 8,180,724, issued May 5, 2012, U.S. Pat. No. 8,170,975, issued May 1, 2012, U.S. Pat. No. 8,001,527, issued Aug. 16, 2011, U.S. Pat. No. 7,996,814, issued Aug. 9, 2011, U.S. Pat. No. 7,954,090, issued May 31, 2011, U.S. Pat. No. 7,900,201, issued Mar. 1, 2011, U.S. Pat. No. 7,870,550, issued Jan. 11, 2011, U.S. Pat. No. 7,865,888, issued Jan. 4, 2011, U.S. Pat. No. 7,788,536, issued Aug. 31, 2010, and U.S. Pat. No. 7,490,073, issued Feb. 10, 2009.

The following U.S. Patents are incorporated in their entirety by reference herein: U.S. Pat. Nos.; 5,754,763; 6,052,785; 6,088,706; 6,243,816; 6,341,312; 6,343,311; 6,681,330; 6,859,879; 6,912,586; 6,915,333; 6,961,726; 7,000,198; 7,110,514; 7,219,233; 7,403,955; 7,870,144; 8,095,579; 7,415,038; 7,602,808; 7,894,478; 7,415,498; 8,090,775; 7,441,000; 8,127,019; 7,519,739; 7,548,974; 7,840,672; 7,610,365; 7,783,728; 7,822,831; 8,140,534; 8,195,617, and 8,204,196. The following U.S. applications are incorporated in their entirety by reference herein: Ser Nos. 13/417,359 and 13/417,527.

The following U.S. Patents are incorporated in their entirety by reference herein: U.S. Pat. Nos. 7,500,262 and 7,603,100. The following U.S. applications are incorporated in their entirety by reference herein: Ser. Nos. 12/390,110 and 12/575,121.

FIELD

This application generally relates to enterprise managed systems and methods relating to enterprise social networks and collaborative application support.

BACKGROUND

Many enterprises (e.g., corporations, partnerships, governments, academic institutions, other organizations, etc.) maintain enterprise computer networks that allow enterprise users, such as employees, to access enterprise applications, data, and services (collectively known simply as "resources"), such as hardware and software applications for email, customer relationship management (CRM), enterprise resource planning (ERP), documents, document management services, enterprise application stores, and the like. Enterprises often allow remote access, such as when enterprise users are not in an enterprise network, using virtualization and other techniques. Also, many enterprises allow users to access enterprise resources via various types of computing devices including desktop computers and mobile devices such as laptops, smartphones, tablet computers, PDAs (personal digital assistant), etc. Additionally, these computer networks and resources may include various cloud computing components.

Virtualized computing resources generally allow for the operating systems, applications, and user settings of multiple users to be included on a single physical machine. Desktop virtualization technology allows multiple instances of an operating system to be kept separate, so the activities of one user do not affect the experience of other users. Cloud computing environments allow for computers to be owned and managed by a cloud operator with resources stored by those computers to be remotely accessed by cloud users, who may be customers of the cloud operator.

Enterprises typically deploy enterprise mobility management (EMM) systems to assist in the management and control of remote access to enterprise resources by mobile devices. EMM systems have traditionally taken the approach of managing entire mobile devices through what are known as mobile device management (MDM) approaches. In such cases, enterprises typically issue mobile devices to employees, which are often intended exclusively for business use, and the enterprise maintains control over the mobile devices and all of their applications and data. A recent trend is to allow employees to use their own mobile device(s) for work purposes (a scenario known as BYOD—bring your own device). It is desirable in this scenario too for the enterprise to maintain control over enterprise resources, which may be accessed by, may be run on, or may be stored on an employee's mobile device. Many enterprise and non-enterprise applications are available for mobile devices. Enterprise mobile applications may be supported via local application delivery or hosted application delivery. Because the choice of mobile device is with the enterprise user, and mobile devices vary in their operating systems and versions of those operating systems, an appropriate EMM solution should include support for a variety of applications and mobile device platforms.

A virtual machine receiver is an application that allows a user a type of virtualized remote access to corporate applications, desktops and data and other enterprise resources. Each receiver communicates with a central enterprise server that lists which applications and other resources have been selected by or are available to the user. Enterprise application stores can provide a centralized point for such applications and resources.

Social networking has become immensely popular. Social network platforms provide a public, semi-public, or private network location where authorized users may share information and collaborate. Known enterprise based social platforms allow an enterprise to set up an internal social web site where users within the organization may share documents and have discussions, and where users from outside the company have no, or only limited, visibility.

SUMMARY

In light of the foregoing background, the following presents a simplified summary of the present disclosure in order to provide a basic understanding of some aspects described herein. This summary is not an extensive overview, and it is not intended to identify key or critical elements or to delineate the scope of the claims. The following summary merely presents various described aspects in a simplified form as a prelude to the more detailed description provided below. According to aspects described herein, this disclosure relates to an enterprise system that incorporates various features of an enterprise-based social platform and an enterprise application store platform. Such an enterprise system is one that allows for various forms of on-line enterprise related collaboration regarding enterprise applications between predetermined groups of enterprise users, thereby leveraging the knowledge and experience of enterprise users with respect to the selection and use of enterprise applications, including enterprise mobile applications.

In some embodiments, the disclosure relates to an enterprise system including an enterprise social platform associated with an application store platform, which is accessible by a computing device in a secure manner. The enterprise social platform stores information indicating user roles within the enterprise and provides at least one social networking feature to a group of users that are associated based on the roles, where the social networking feature is associated with an enterprise application store. An application catalog system of the enterprise application store platform includes sets of enterprise applications that are available for selection by enterprise users, and the application catalog system provides access to selected enterprise applications. An application store storage system includes a plurality of files associated with each one of the plurality of applications, wherein the plurality of files includes enterprise customized application templates, enterprise application usage information, application evaluation information, application recommendations, or an application support forum. An application store management system presents selected ones of the files to a user within the enterprise social platform based on the user's membership in the group of users.

The social networking features may include a comment feature, an email feature, a chat feature, an instant messaging feature, an audio conferencing feature, a video conferencing feature, a file sharing feature, a media sharing feature, a document sharing feature, or a file handling feature. Further, the social networking feature may be a rating feature, a recommendation feature, a help feature, an approval request feature, a how-to feature, or an evaluation feature.

The user role may be based on an organization chart, an employee classification, an enterprise role, an enterprise department classification, a project team membership, or an enterprise grouping based upon a closeness metric. The application store management system may provide a customized list of available enterprise applications to a user based on the user role. The application store may be a publicly accessible application store or a private enterprise store with downloadable applications. The enterprise social platform may provide a customized user interface for user interaction in an application support forum. The application store management system may determine whether user authorization for accessing an application is required based on the user role. An on-line approval process may be initiated by the application store management system if an application is not pre-approved for a user. Additionally, the application store management system may provide application recommendations to a user based on user type.

Further, the application store management system may associate an enterprise application with a corresponding sponsor service and a corresponding sponsor. For example, the corresponding sponsor service may be a recommendation service, an application help service, or an application approval service. Further, the corresponding sponsor may be a group based on the user role, and wherein the application store management system presents a user with at least one sponsored service based on the enterprise applications selected by the user.

An application wrapper may be provided for at least one of the enterprise applications, wherein the application wrapper is adapted to secure execution of the enterprise application on a mobile device of an enterprise user. The security of the application wrapper may be based on the role of the user of the mobile device in the enterprise.

A virtual private network connection (VPN) may be provided for delivery of an enterprise application, the VPN being specific to a particular enterprise application, with the VPN providing a secure connection between the mobile device and the enterprise to facilitate secure use of the enterprise application by the user of the mobile device. The VPN may be configured to allow execution of the enterprise application features on the mobile device while storage of data that is identified as sensitive based on the role of the user is allowed only on a secure server of the enterprise and prevented from being stored on the mobile device of the user.

The enterprise social platform and the enterprise application store platform may be accessed by a secure, single sign-on facility that includes security based on the role of the user in the enterprise.

In some embodiments, the disclosure relates to a method for providing application support to enterprise users. The method includes storing information indicating user roles within an enterprise, providing at least one social networking feature in an enterprise social platform to a group of users that are associated based on the user roles, wherein the social networking feature is associated with an enterprise application store, storing a catalog of enterprise applications that are available for selection by enterprise users, storing a plurality of files associated with each one of the enterprise applications in the catalog, wherein the plurality of files includes at least one of enterprise customized application templates, enterprise application usage information, application evaluation information, application recommendations, and an application support forum; and presenting selected ones of the files to a user within the enterprise social platform based on the user's membership in the group of users.

BRIEF DESCRIPTION OF THE DRAWINGS

Figure 1:
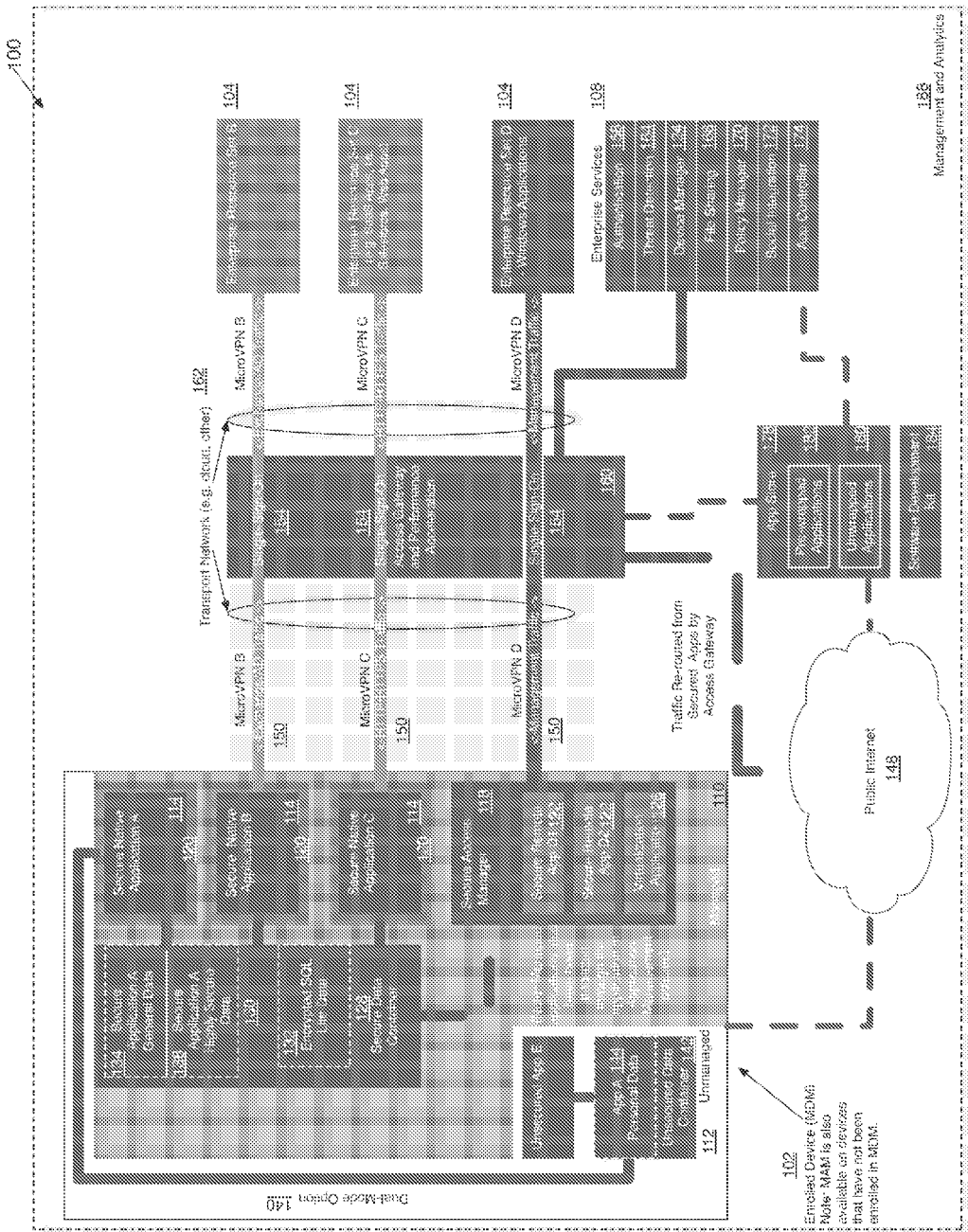
Figure 1A:
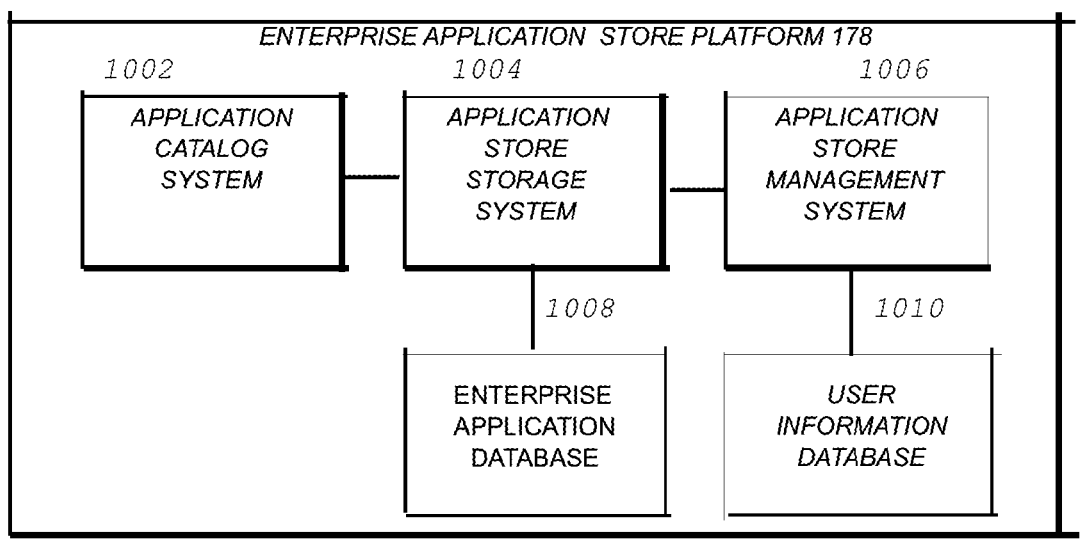
Figure 2:
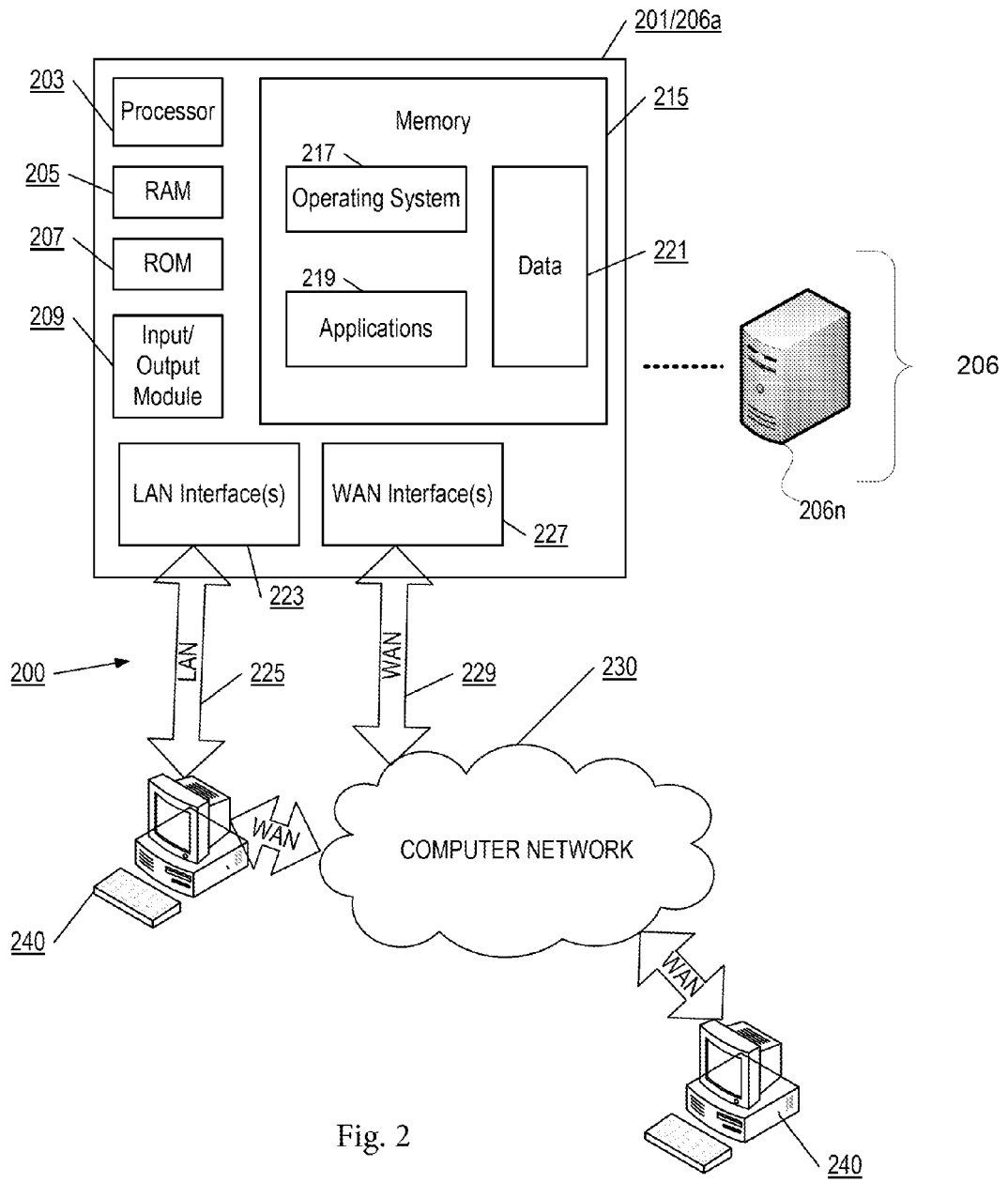
Figure 2A:
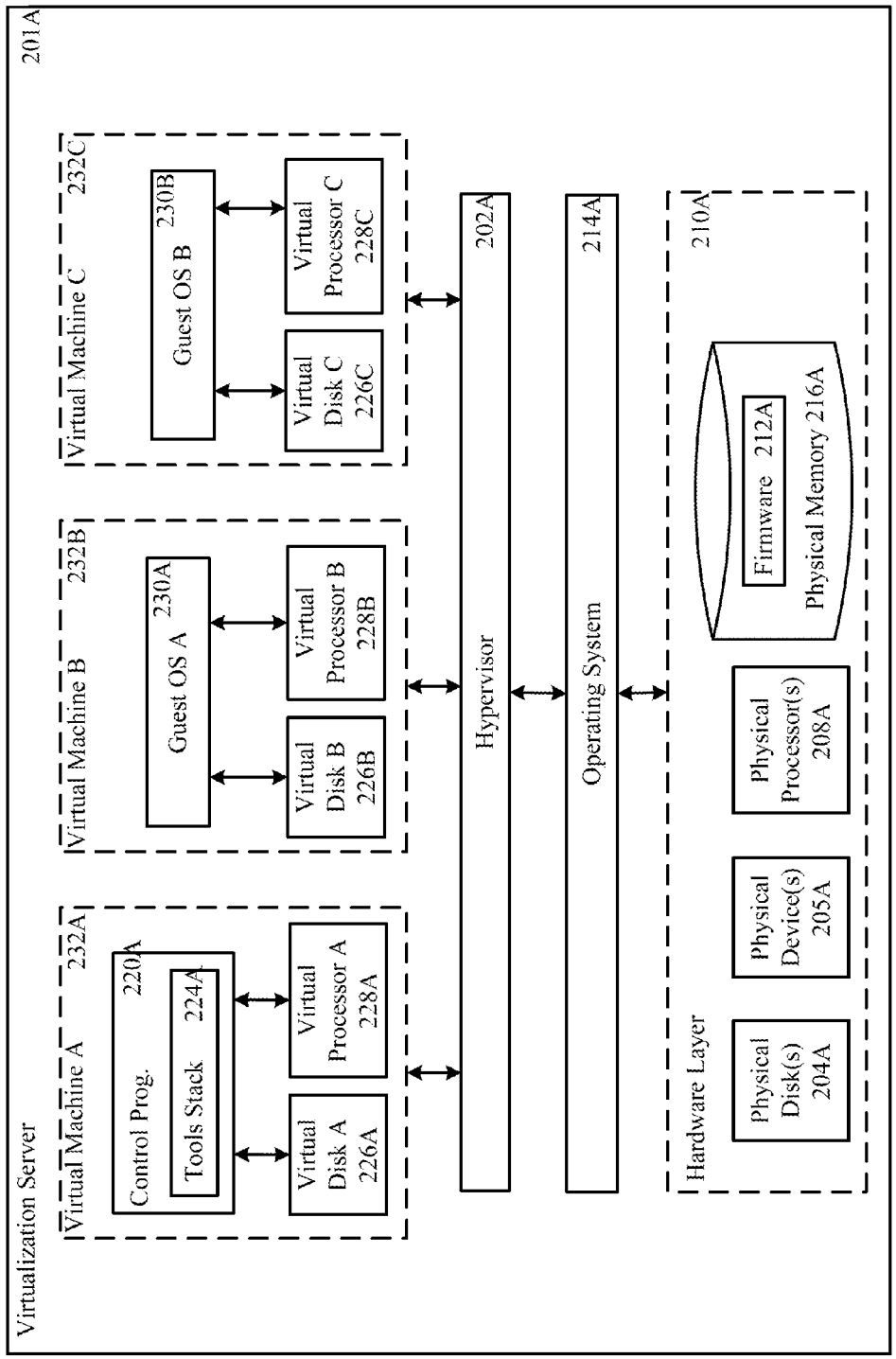
Figure 9:
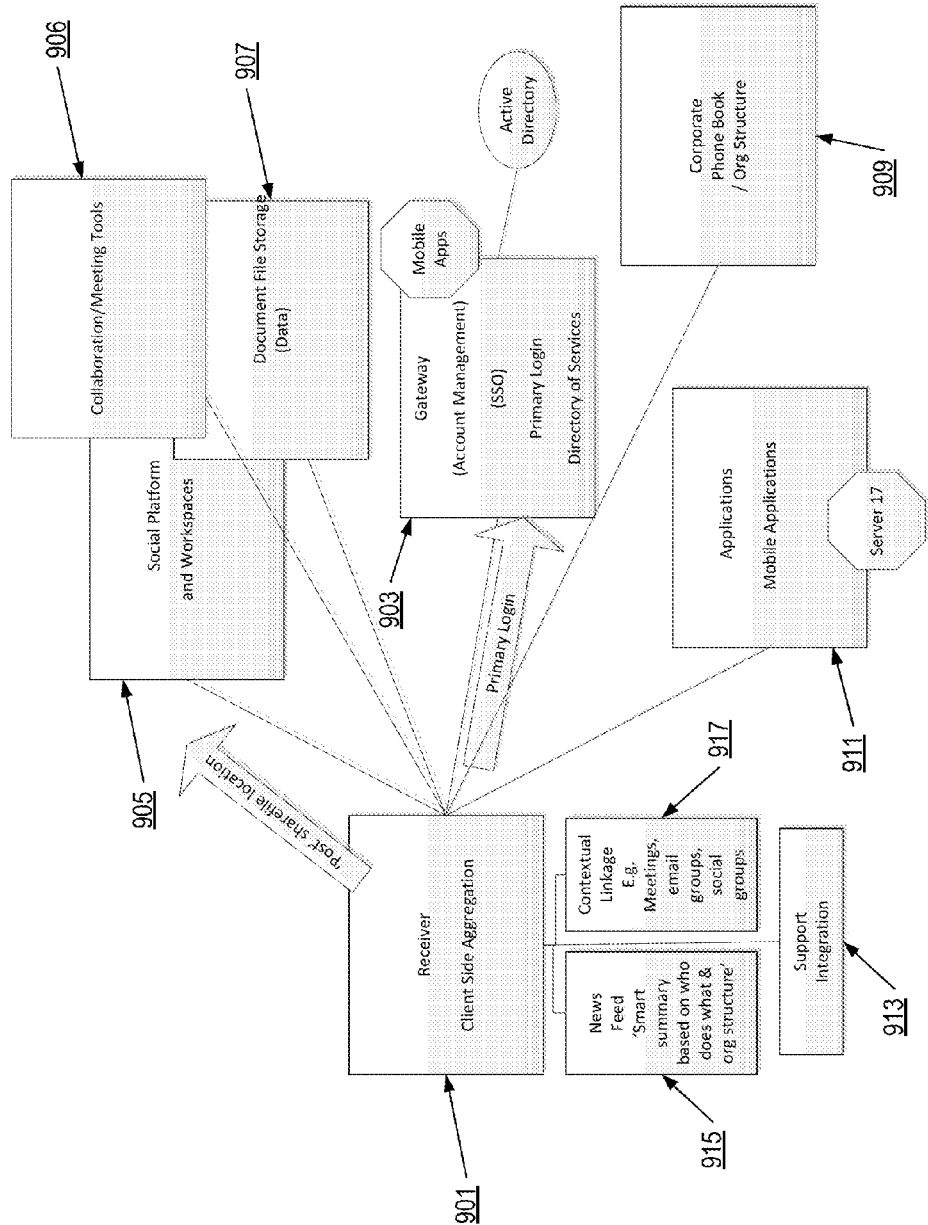
Figure 10:
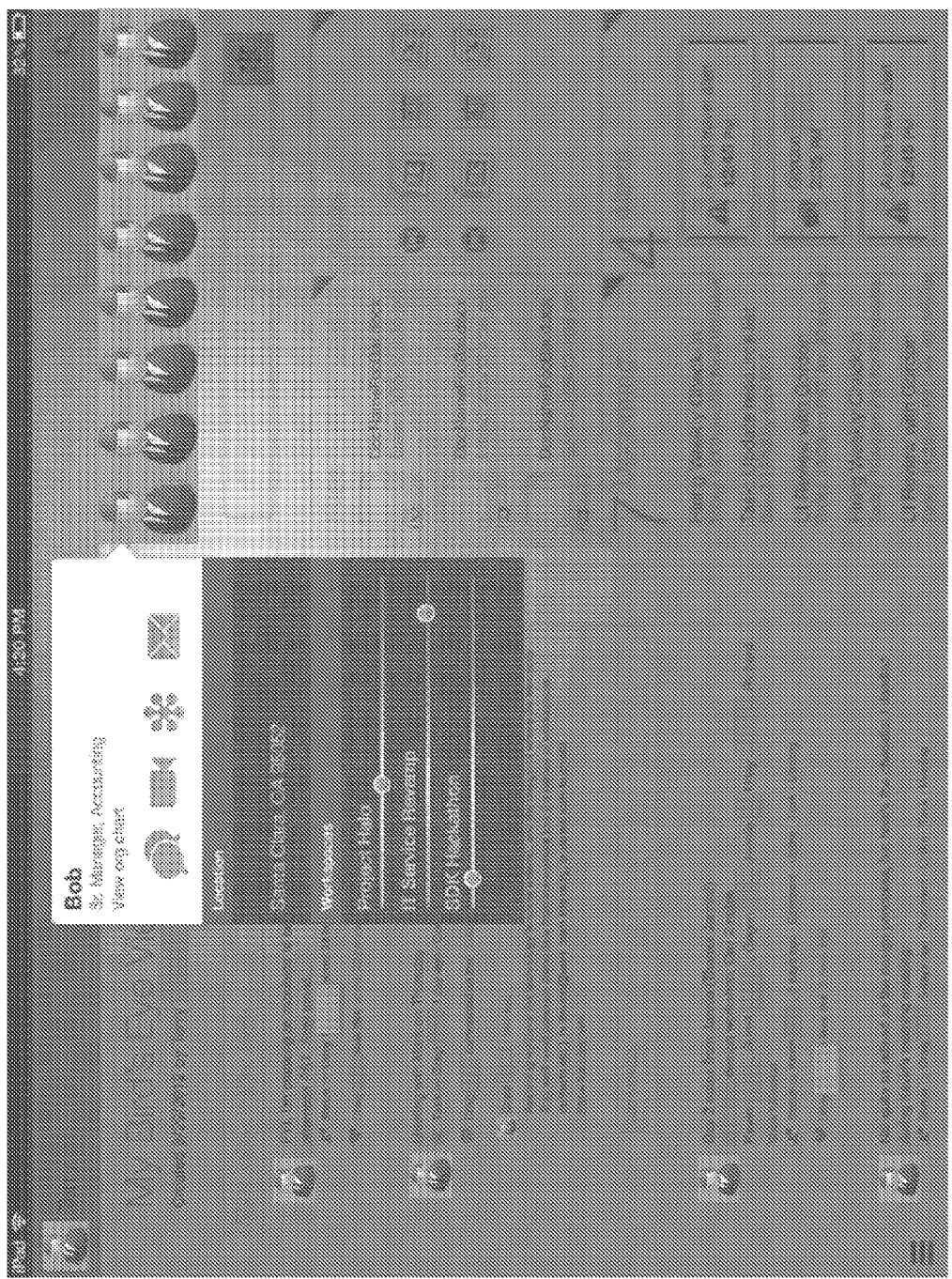

Having thus described aspects of the disclosure in general terms, reference will now be made to the accompanying drawings, which are not necessarily drawn to scale, and wherein:

FIG. 1 illustrates an exemplary enterprise management system in which various aspects of the disclosure may be implemented;

FIG. 1A illustrates an exemplary enterprise application store platform in which various aspects of the disclosure may be implemented;

FIG. 2 illustrates another exemplary operating environment in which various aspects of the disclosure may be implemented;

FIG. 2A is a block diagram of an exemplary virtualization server in accordance with one or more illustrative aspects of the disclosure;

FIGS. 3-8 illustrate exemplary user interfaces for an enterprise-based social platform including an ability to collaborated over the social platform according to one or more illustrative aspects described herein;

FIG. 9 illustrates an exemplary enterprise system architecture according to one or more illustrative aspects described herein; and FIG. 10 illustrates an exemplary user interface for enterprise systems according to one or more illustrative aspects described herein.

DETAILED DESCRIPTION

In the following description of the various embodiments, reference is made to the accompanying drawings, which form a part hereof, and in which is shown by way of illustration various embodiments in which aspects described herein may be practiced. It is understood that these embodiments are provided by way of example to illustrate various features and principles of the invention, and that the invention hereof is broader than the specific exemplary embodiments disclosed. It is to be understood that other embodiments may be utilized and structural and functional modifications may be made without departing from the scope and spirit of the present disclosure.

As will be appreciated by one of skill in the art upon reading the following disclosure, various aspects described herein may be embodied as a method, a data processing system, a computing device, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

The proliferation of mobile devices in conjunction with mobile lifestyles has created a demand for enterprise mobile applications, along with a need for securely managing these applications while providing a positive user experience with respect to obtaining and using enterprise applications. Collaboration tools inherent in enterprise social network platforms may be leveraged to increase the productivity and efficiency of the enterprise user with respect to selection and use of enterprise applications, both on mobile devices and other computer devices such as desktops.

The concept of bring your own device (BYOD) relates to employees of an enterprise having the flexibility to use a mobile device of their choice to access enterprise resources, while also using the mobile device as a personal device. The enterprises supporting BYOD may benefit from cost savings due to not having to purchase mobile devices for their employees, while simultaneously benefitting from increased employee productivity that may result in the employee having seamless access to enterprise resources which is location independent, i.e. the employee no longer has to be physically in the office to access enterprise resources. The employee may benefit by having the option to use their preferred mobile device, while also having increased freedom of time and location, potentially able to perform many of their job functions at a time and in a place of the employee's choosing.

BYOD, while providing benefits as described for both employers and employees, also introduces a number of challenges, when attempting to both secure enterprise data and resources, while allowing the employee flexibility to continue to use their device as a personal device. The security requirements of the enterprise may be inherently in conflict with the convenience expected by the user. Concepts such as securing applications that access enterprise resources, as well as segregating secure from unsecured data on the phone become increasingly important in a BYOD environment. For added convenience, which may help drive employee adoption, an enterprise may wish to provide a seamless interface, which allows the user to operate the phone and access secure and unsecured resources and services with minimal disruption to the user experience inherent in the mobile device itself. For these and other reasons, a solution such as that outlined in this description may provide the enterprise the capabilities required to secure enterprise resources, while allowing the user to access both enterprise and personal resources seamlessly, conveniently, and efficiently with the device.

An exemplary system for mobile device management is illustrated in FIG. 1, while an exemplary system for enterprise management (not limited to mobile devices) is illustrated with respect to FIGS. 2 and 2a, described below.

With respect to FIG. 1, the architecture of system 100 enables a user of a client device such as mobile device 102 to both access enterprise or personal resources from a mobile device 102 and use the mobile device 102 for personal use. Further, the architecture provides security of data and applications for an enterprise. Although only a single mobile device 102 is depicted in FIG. 1, the architecture provides support for multiple devices, wherein each device may have the functionality described with respect to mobile device 102.

A user may access enterprise servers and enterprise resources 104 or enterprise services 108 using a mobile device 102 that is purchased by the user or a mobile device 102 that is provided by the enterprise to the user. The user may utilize the mobile device 102 for business use only or for business and personal use. The mobile device may run an iOS operating system, an Android operating system, a Windows operating system, a Blackberry operating system, or the like. The enterprise may choose to implement policies to manage the mobile device 102. The policies may be implanted through a firewall or gateway in such a way that the mobile device may be identified, secured or security verified, and provided selective or full access to the enterprise resources upon authentication. The policies may be mobile device management policies, mobile application management policies, mobile data management policies, or some combination of mobile device, application, and data management policies. A mobile device 102 that is managed through the application of mobile device management policies may be referred to as an enrolled device.

The operating system of the mobile device may be separated into a managed portion 110 and an unmanaged portion 112. The managed portion 110 may have policies applied to it to secure the applications running on and data stored in the managed portion. The applications running on the managed portion may be secure authorized applications. The secure authorized applications may be email applications, web browsing applications, software-as-a-service (SaaS) access applications, Windows Application access applications, and the like. The secure authorized applications may be secure native applications 114, secure remote applications 122 executed by a secure access manager 118, virtualization applications 126 executed by a secure access manager 118, and the like. The secure native applications 114 may be downloaded by from an enterprise application store and be wrapped by a secure application wrapper 120. The secure application wrapper 120 may include integrated policies that are executed on the mobile device 102 when the secure native application is executed on the device. The secure application wrapper 120 may include meta-data that points the secure native application 114 running on the mobile device 102 to the resources hosted at the enterprise that the secure native application 114 may require to complete the task requested upon execution of the secure native application 114. The secure remote applications 122 executed by a secure access manager 118 may be executed within the secure access manager application 118. The virtualization applications 126 executed by a secure application manager 118 may utilize resources on the mobile device 102, at the enterprise resources 104, and the like. The resources used on the mobile device 102 by the virtualization applications 126 executed by a secure access manager application 118 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 104, and the like. The resources used at the enterprise resources 104 by the virtualization applications 126 executed by a secure access manager 118 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a GUI and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others may not be prepared or appropriate for deployment on the mobile device so the enterprise may elect to provide the mobile user access to the unprepared applications through virtualization techniques. As another example, the enterprise may have large complex applications with large and complex data sets (e.g. material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g. human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information to be stored.

In connection with the virtualization application, as described herein, the mobile device may have a virtualization application that is designed to present GUI's and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like.

The applications running on the managed portion may be stabilized applications. The stabilized applications may be managed by a device manager 124. The device manager 124 may monitor the stabilized applications and utilize techniques for detecting and remedying problems that would result in a destabilized application if such techniques were not utilized to detect and remedy the problems.

The secure applications may access data stored in a secure data container 128 in the managed portion 110 of the mobile device. The data secured in the secure data container may be accessed by the secure wrapped applications 114, applications executed by a secure application launcher 122, virtualization applications 126 executed by a secure application launcher 122, and the like. The data stored in the secure data container 128 may include files, databases, and the like. The data stored in the secure data container 128 may include data restricted to a specific secure application 130, shared among secure applications 132, and the like. Data restricted to a secure application may include secure general data 134 and highly secure data 138. Secure general data may use a strong form of encryption such as AES 128-bit encryption or the like, while highly secure data 138 may use a very strong form of encryption such as AES 254-bit encryption. Data stored in the secure data container 128 may be deleted from the device upon receipt of a command from the device manager 124. The secure applications may have a dual-mode option 140. The dual mode option 140 may present the user with an option to operate the secured application in an unsecured mode. In an unsecured mode, the secure applications may access data stored in an unsecured data container 142 on the unmanaged portion 112 of the mobile device 102. The data stored in an unsecured data container may be personal data 744. The data stored in an unsecured data container 142 may also be accessed by unsecured applications 147 that are running on the unmanaged portion 112 of the mobile device 102. The data stored in an unsecured data container 142 may remain on the mobile device 102 when the data stored in the secure data container 128 is deleted from the mobile device 102. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the inventions described herein, an enterprise may perform a selective wipe.

The mobile device may connect to enterprise resources 104 and enterprise services 108 at an enterprise, to the public Internet 148, and the like. The mobile device may connect to enterprise resources 104 and enterprise services 108 through virtual private network connections. The virtual private network connections may be specific to particular applications 150, particular devices, particular secured areas on the mobile device, and the like. For example, each of the wrapped authorized applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HTTP traffic, HTTPS traffic, application management traffic, and the like. The virtual private network connections may support and enable single-sign-on (SSO) authentication processes 154 via the secure access manager 118. The single-sign-on processes may allow a user to provide a single set of authentication credentials, which are then verified by an authentication service 158. The authentication service 158 may then grant to the user access to multiple enterprise resources 104, without requiring the user to provide authentication credentials to each individual enterprise resource 104.

The virtual private network connections may be established and managed in conjunction with an access gateway 160. In some embodiments, per application VPN functionality is achieved using VPN client 119 in conjunction with secure access manager 118 as described below. The access gateway 160 may include performance enhancement features that manage, accelerate, and improve the delivery of enterprise resources 104 to the mobile device 102. The access gateway may also re-route traffic from the mobile device 102 to the public Internet 148, enabling the mobile device 102 to access publicly available and unsecured applications that run on the public Internet 148. The mobile device may connect to the access gateway via a transport network 162. The transport network 162 may be a wired network, wireless network, cloud network, local area network, metropolitan area network, wide area network, public network, private network, and the like.

The enterprise resources 104 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 104 may be premise-based resources, cloud based resources, and the like. The enterprise resources 104 may be accessed by the mobile device 102 directly or through the access gateway 160. The enterprise resources 104 may be accessed by the mobile device 102 via a transport network 160. The transport network 162 may be a wired network, wireless network, cloud network, local area network, metropolitan area network, wide area network, public network, private network, and the like.

The enterprise services 108 may include authentication services 158, threat detection services 164, device manager services 124, file sharing services 768, policy manager services 170, social integration services 172, application controller services 174, an enterprise social platform, and the like. Authentication services 158 may include user authentication services, device authentication services, application authentication services, data authentication services and the like. Authentication services 158 may use certificates. The certificates may be stored on the mobile device 102, by the enterprise resources 104, and the like. The certificates stored on the mobile device 102 may be stored in an encrypted location on the mobile device, the certificate may be temporarily stored on the mobile device 102 for use at the time of authentication, and the like. Threat detection services 164 may include intrusion detection services, unauthorized access attempt detection services, and the like. Unauthorized access attempt detection services may include unauthorized attempts to access devices, applications, data, and the like. Device management services 124 may include configuration, provisioning, security, support, monitoring, reporting, and decommissioning services. File sharing services 768 may include file management services, file storage services, file collaboration services, and the like. Policy manager services 170 may include device policy manager services, application policy manager services, data policy manager services, and the like. Social integration services 172 may include contact integration services, collaboration services, integration with social networks such as Podio, GoToMeeting, Facebook, Twitter, and LinkedIn, and the like. Application controller services 174 may include management services, provisioning services, deployment services, assignment services, revocation services, wrapping services, and the like.

The enterprise mobility system 100 may include an enterprise application platform 1000 (described more specifically with respect to FIG. 1A) that includes an enterprise application database or store 178. The application store 178 may include unwrapped applications 180, pre-wrapped applications 182, and the like. Applications may be populated in the application store 178 from the application controller 174. The enterprise application store 178 may be accessed by the mobile device 102 through the access gateway 160, through the public Internet 148, or the like. The application store 178 may provide access to a software development kit 184. The software development kit 184 may provide a user the capability to secure applications selected by the user by wrapping the application as described previously in this description. An application that has been wrapped using the software development kit 184 may then be made available to the mobile device 102 by populating it in the application store 178 using the application controller 174.

The enterprise mobility system 100 may include a management and analytics capability 188. The management and analytics capability 188 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

In a mobile environment, a client agent may be designed and constructed to control and manage the tunneling of data packet traffic between a device and an access gateway, and thus an enterprise server and enterprise resources. In some embodiments, the client agent may be designed and constructed to provide a per application VPN environment for a mobile platform or operating system. This functionality may be achieved using a VPN manager in conjunction with a secure access manager 118 on the mobile device, which together operate as an application manager to determine an originating application of data packets to provide a per application VPN functionality for secure authorized applications on the mobile device, while preventing non-authorized applications from accessing an enterprise server/resource.

The application controller 174 and enterprise application store platform facilitate the control and secure delivery of enterprise and web Software-as-a-Service (SaaS) applications, native applications, and integrated enterprise based data to the mobile device 102. The enterprise application store platform provides a single place to manage enterprise application delivery, as well as a single point of access for authenticated enterprise users.

An enterprise system including the mobile application store platform linked to an enterprise social platform 1000 provides collaborative support for application use. Mobile enterprise applications may be recommended and made available to users via the enterprise application store platform 1000, alone or in conjunction with an enterprise social platform. For example, the enterprise application store platform 1000 can be linked to an enterprise social platform, such as Podio, GoToMeeting, or others, as described below, to form an enterprise system for providing collaborative application support to users. An enterprise social platform and the enterprise application store platform 1000 may each be accessed by the mobile device 102 through the access gateway 160, and both may be accessed via an intuitive and easy to use User Interface (UI), such as shown and described below.

Specifically, as shown in FIG. 1A, enterprise application store platform 1000 may include various components such as an application catalog system 1002, an application store storage system 1004, an application store management system 1006, an enterprise application database 1008, and a user information database 1010.

The application catalog system 1002 may include sets of applications that are recommended for and/or available for selection by the enterprise users. Various applications may be recommended and made available to users based on their user type or role within an enterprise, and thus customized lists of applications may be presented to different users or user groups. For example, all employees may be presented with secure e-mail and browser applications to select and download, while other groups of users may be presented with additional applications. For example, project managers may additionally be presented with applications specific to managing projects such as a timesheet application, a deliverables application, and a project collaboration application, or the like; while a sales team may additionally be presented with applications specific to sales such as a lead tracking application, customer resource management application, an expense reporting application, or the like; while engineers in an R&D group may be presented with a different list of applications specific to their role. Links for downloading these applications may be provided such as to link to a publically accessible application store or to link to the private enterprise application database.

The application store storage system may include files associated with various applications. The files may include information relevant to applications including application evaluations, such as rating, rankings, or other application assessments; application usage guides, such as help tools, tips, and application templates that may be customized according to user types or roles within the organization; and application recommendations. Recommendations for applications may be generated by taking advantage of knowledge of the organizational structure and interactions between users based on their roles as described below.

These files may also include sponsor information which may relate a specific application to a particular sponsor, such as an enterprise IT department, an enterprise billing department, administration, or other group based on a user role. The sponsor information may also link a corresponding sponsor service to the specific application, where the sponsor service is a recommendation service, an application help service, or an application approval service.

The application storage system may also include other types of information relating to the applications including an application support forum for supporting various forms of user feedback.

The user information database 1010 includes information relating to user connections, roles and user groups within an enterprise and information regarding which users or groups use which applications. This information can be provided from various sources, such as an HR system or from the enterprise IT department. For example, user groups can be defined based on user roles, user types or other classifications, such based on an organization chart, a department or project team, title or role grouping. User groups may also be formed by analyzing degrees of contacts between enterprise users or otherwise determining a closeness metric between users. The user information database provides useful information to generate appropriate recommendations for applications to various users.

The application store management system integrates information from various modules and presents selected files to a user in an enterprise social platform based on factors such as the user's membership in a defined group of users, as more fully explained below. The application store management system can also provide application recommendations to a user; determine whether user authorization for accessing applications is required; and facilitate an on-line application approval process. These functions can occur in conjunction with use of an enterprise social network platform.

In operation, enterprise users of mobile device 102 may log on to the gateway 160 and enterprise network by submitting authentication requests to the gateway and receiving authentication responses from the gateway. The gateway 160 then provides access to an enterprise system including an enterprise social platform and enterprise application store platform. In some cases, enterprise users may view lists of available and recommended mobile applications and download selected ones to their mobile devices. Enterprise users may also be provided with files and other information relating to the selected applications. When an enterprise user downloads an application, the user may also receive a corresponding application policy, and the mobile application may then be constrained to operate on the mobile device 102 in accordance with the application policy.

Generally, the mobile applications supported and hosted by the enterprise application store platform are specially designed or adapted for use with the enterprise, i.e., they are not applications that general users may download for their own personal activities (e.g., news apps, sports apps, Facebook app, etc.). In some cases, mobile applications are designed specially for the enterprise network. In other examples, the applications are widely used applications that may be adapted specifically for use with the enterprise network. For example, an application may be provided with additional code that enables the application to conform with the framework of the enterprise network. Such code may be compiled into the application using an SDK (software development kit). Alternatively, such code may be applied as a wrapper around the general-use application, to adapt it specifically for use with the enterprise network. In general, the additional code may serve to divert API calls from the mobile application through the corresponding application policy, such that the policy may control the behavior of the mobile application on the mobile device.

As noted above, in some cases, enterprise mobile applications are hosted in a private enterprise cloud. Users may download and install these applications in their mobile devices and some of these applications may work remotely (i.e. when the user is not in the corporate network). Some of the mobile enterprise applications may be hosted on the application controller 174, and remote access for the installed applications may be supported by access gateway 160.

Figure 3:
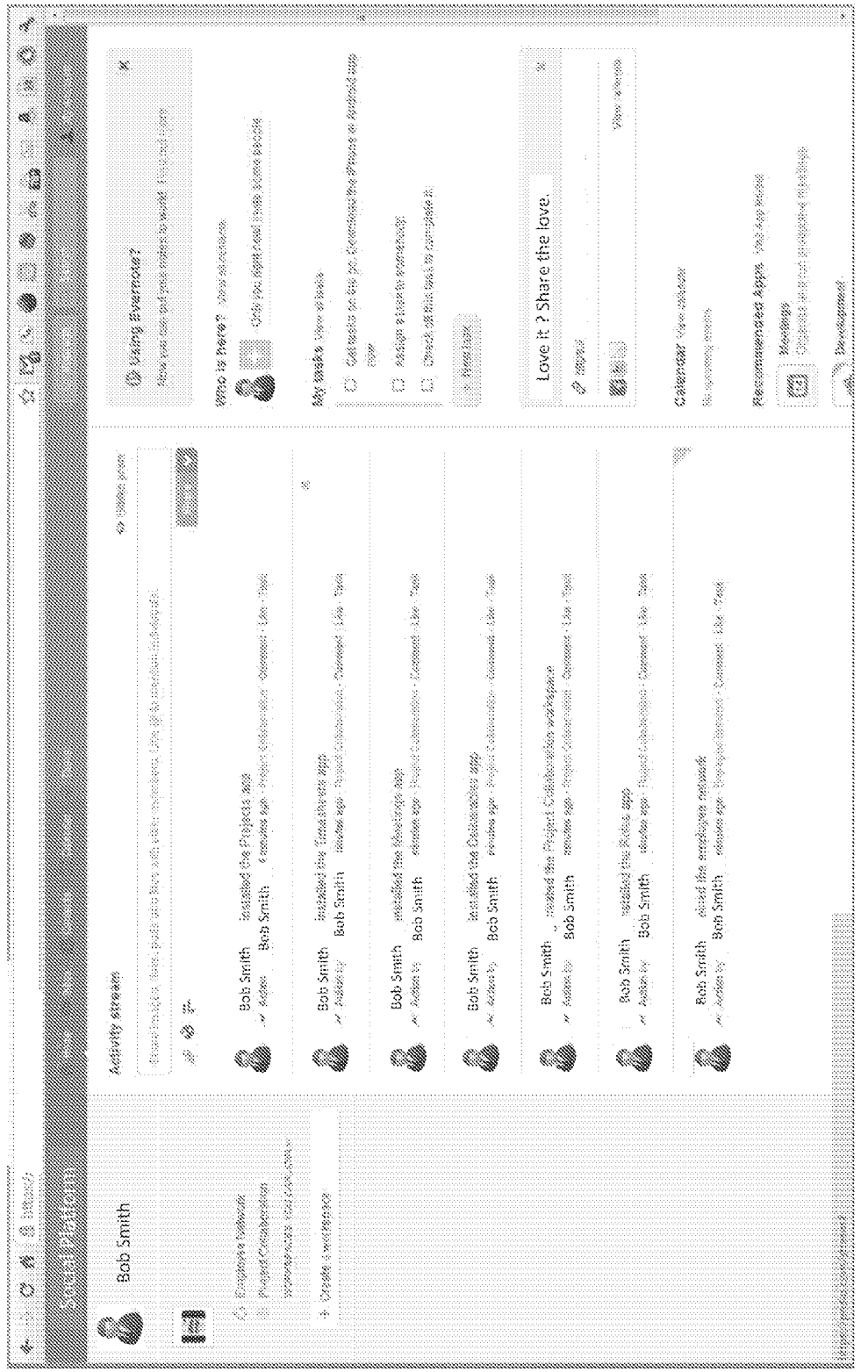

With initial reference to FIG. 3, methods and systems for providing enterprise-based application support using a social network platform are further described. An enterprise-based social network platform 301, such as Podio®, or Yammer®, etc., provides social networking features for defined groups of enterprise users, and also provides various social networking features relating to an enterprise application store. Platform 301 allows for various workspaces to be set up, relating for example, to topics such as project management, product development, customer resource management (CRM) and lead management, recruiting, event management, and others, and for collaboration to occur between users using social networking features such as a chat feature, email, instant messaging audio conferencing video conferencing, file sharing, media sharing, document sharing, and or file handling.

Figure 4:
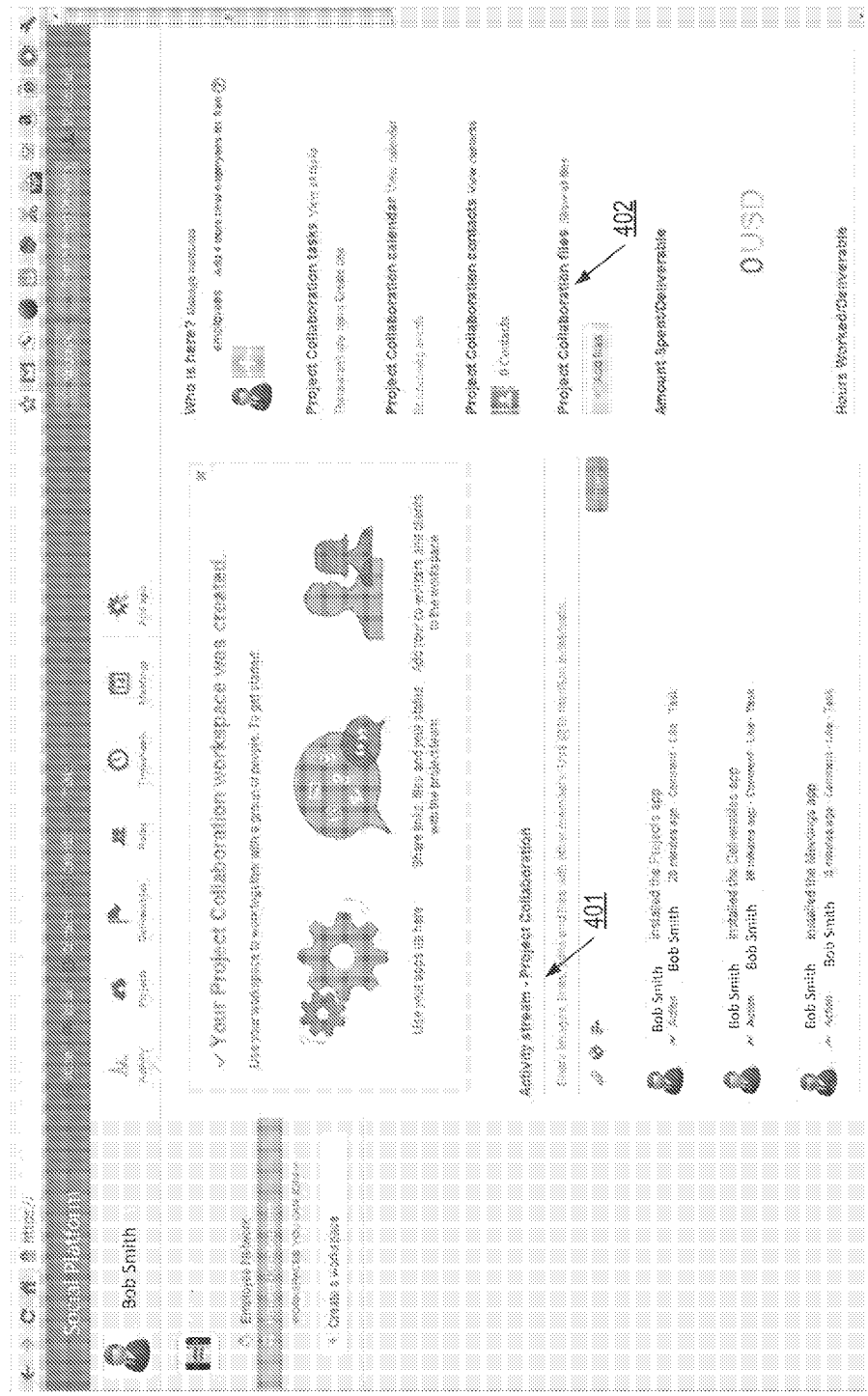

As shown in FIG. 4, platform 301 may be used for online project management for a predefined group of users, such as a project team. The social network platform integrates a project discussion forum 401 in a centralized place along with relevant files 402 and other information such as tasks, calendar, and contacts. The project discussion forum 401 may include an activity stream showing which applications are installed by other group members, and may include a location for comments by other users. The discussion forum can discuss such subject matter such as application ratings, recommendations for applications, help for applications, application tips, etc.

Platform 301 may also provide a unique application builder to allow project management applications to be customized to fit a particular organization's work flow(s). Users may stay on top of deliverables and deadlines with a built-in task manager, and use platform reporting and intelligent calendar applications to easily keep track of milestones, meetings, budgets and work progress.

Figure 5:
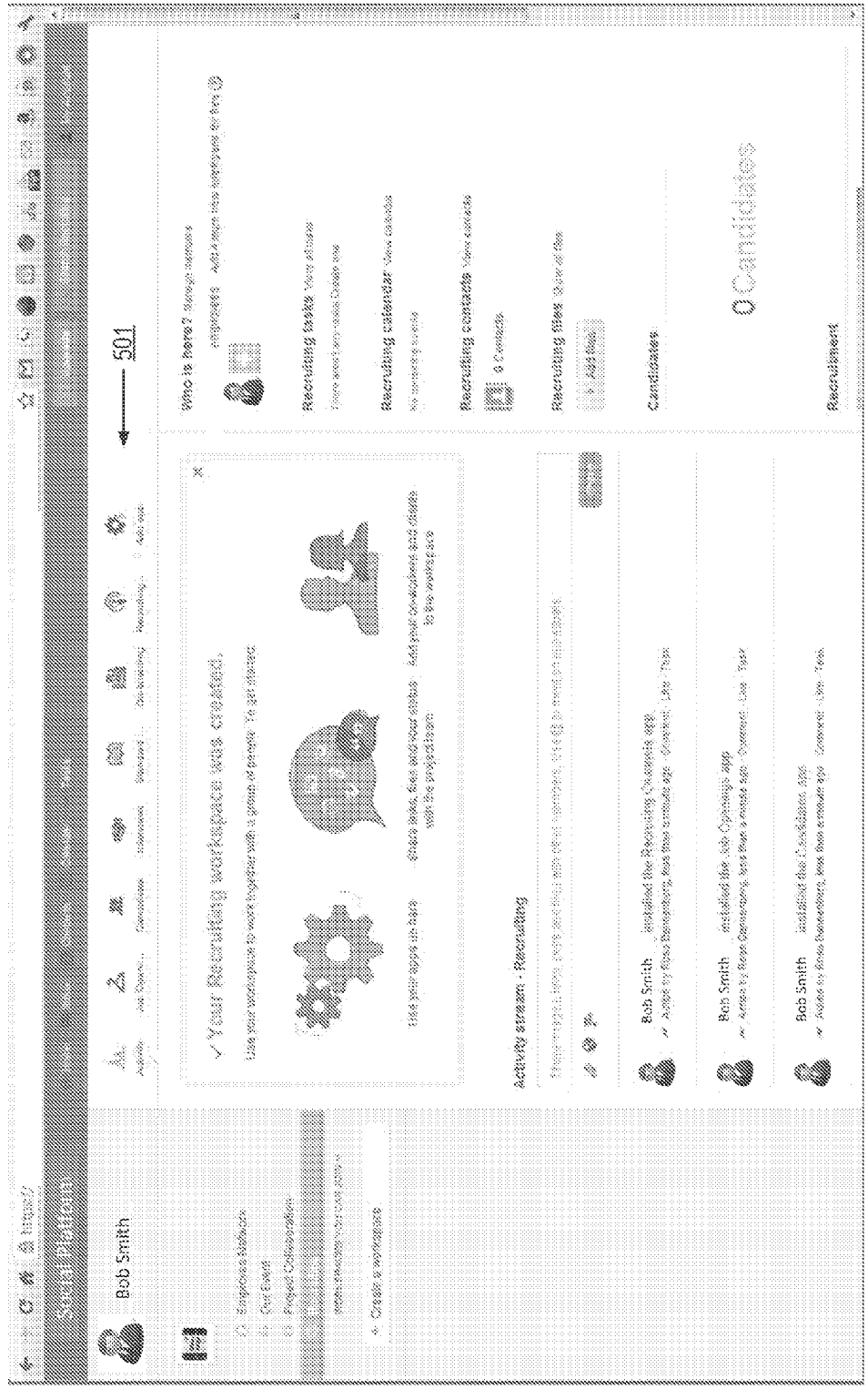
Figure 6:
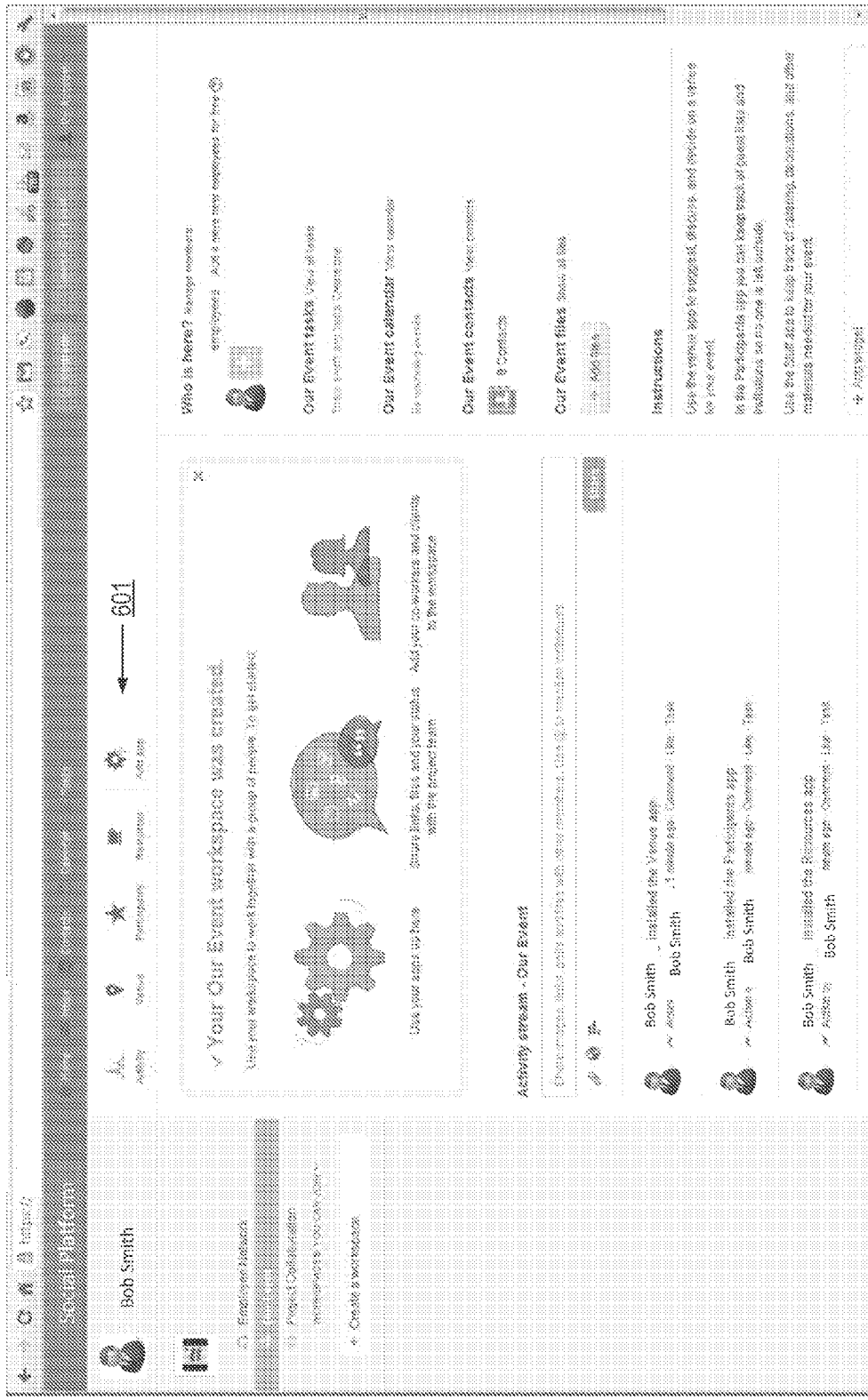

The enterprise social platform 301 is linked to the enterprise application store platform such that enterprise applications can be easily accessed, such as via an add application icon. The enterprise application store platform can provide a sorting of applications to be presented on a user's social network user interface according to a group role. For example, users who are part of a project team may be presented with and may select applications to install such as a projects application, a deliverables application, a meetings application, and the like, as shown in FIG. 4. As shown in FIG. 5, a user who is part of a recruiting team may be presented with and may select and install a recruiting channels application, a job openings application, and a candidates application as indicated at 501. A user who is part of an event planning team may likewise select and install a venue application, a participants application, and a resources application, as indicated at 601 in FIG. 6. Further, users may be presented with a customized user interface for the social network platform according to selected applications or user roles.

Figure 7:
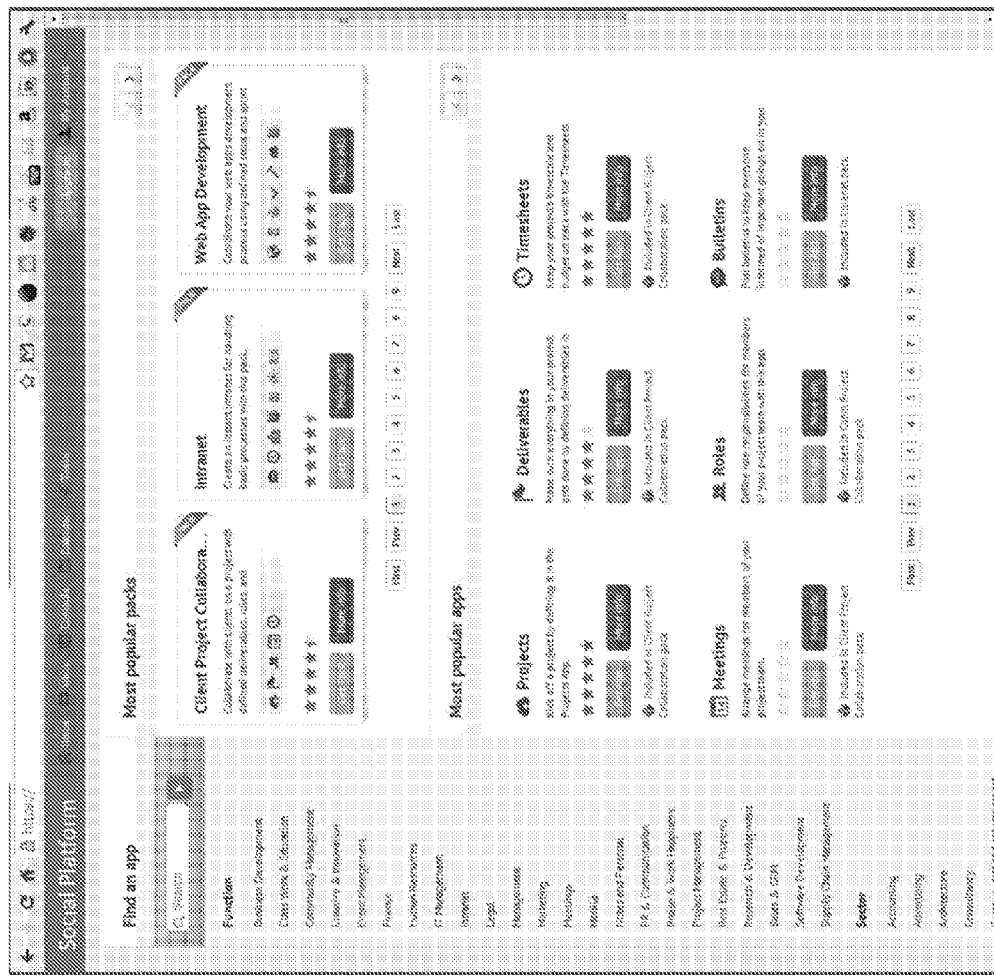

Platform 301 may provide these and countless other custom capabilities through installation of new applications, such as may be presented in an application catalog as shown in FIG. 7. Applications can be grouped together in packs, or sorted by functions, user roles, etc. and provided with user ratings. Access links can be provided to a publicly available application store or to an enterprise application store for accessing the applications. Information links can also be provided, which can link to various files of information relating to the applications, such as provided by the application storage system of enterprise application store platform 1000. The files may include information relevant to applications including application evaluations, such as rating, rankings, or other application assessments; application usage guides, such as help tools, tips, and application templates that may be customized according to user types or roles within the organization; and application recommendations. Recommendations for applications may be generated by taking advantage of knowledge of the organizational structure and interactions between users based on their roles.

As illustrated in FIG. 10 (described in more detail below), recommendations may also be made based on the group/project activities of the user. For example, the pop-up window here illustrates how active the user is across various social/work groups. Degree of activity can be illustrated such as in the form of a heat map.

Figure 7A:
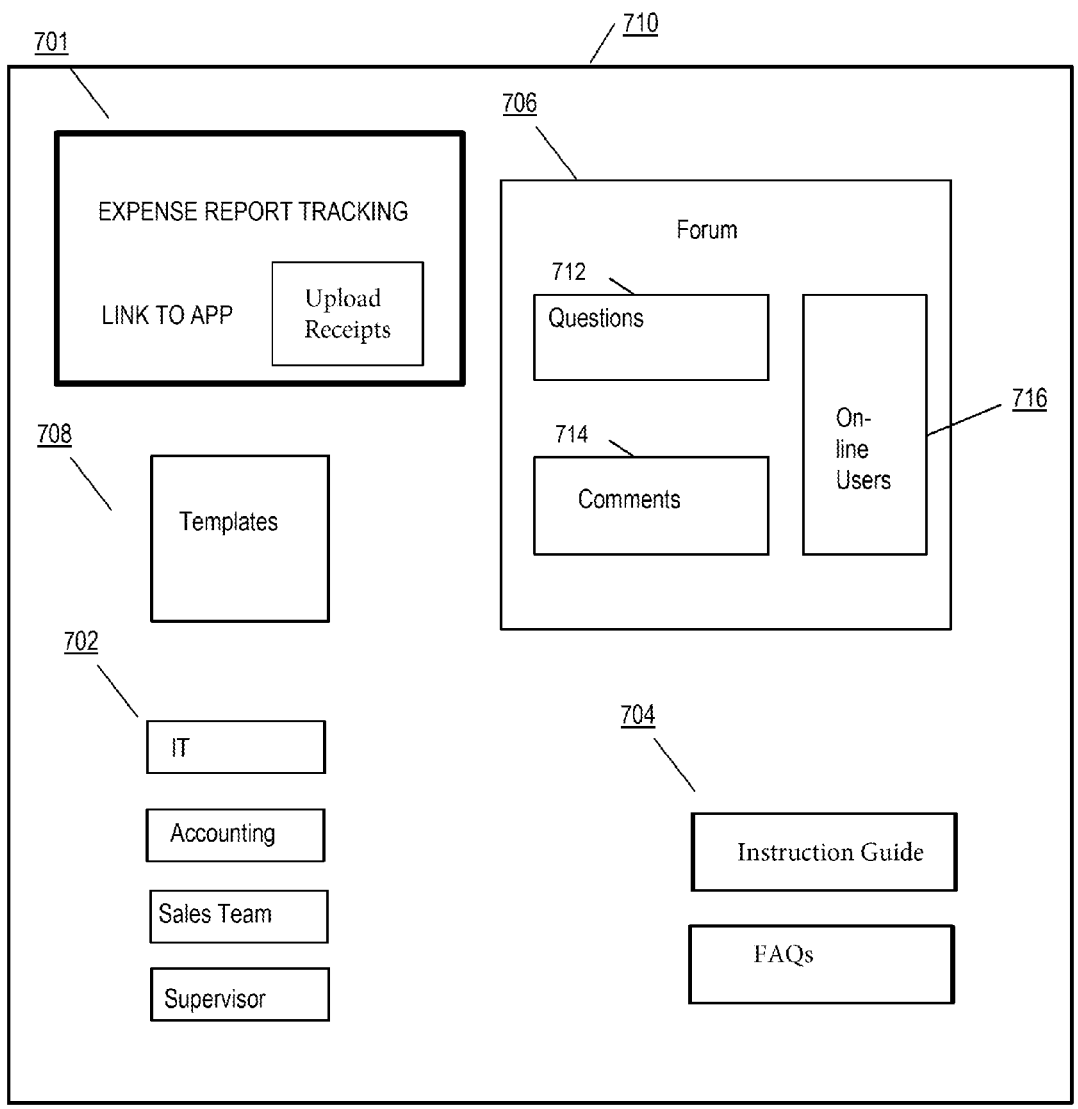

FIG. 7A illustrates an example of information and links that can be provided with respect to an enterprise application, such as an expense report tracking application, which can be accessed as a webpage 710 for example. The webpage 710 can include features such as links to sponsors 702, application usage guides 704, templates 708, an application forum 706, along with other features. For example, the sponsors may include IT, accounting, and a group and/or an individual linked to the application user, such as a sales team or a user's supervisor. These sponsors can be contacted directly or questions can be routed directly to them such as via the forum. The application usage guides 704 can include an instruction guide, which can be made specific to a user, such as a member of a sales team. Usage guides can provide tips, frequently asked questions, and the like, such as in the form of documents, or audio or video files. Similarly, the templates or other forms for the application can be made specific to a user, such as a member of a sales team. Other templates and forms could be customized for other users, such as members of a project group, or members of an events planning department, for whom enterprise policy rules with respect to expense tracking may be different.

A forum 706 can be provided, with an input question field 712, a comments field 714 for other users to comment and provide other feedback, and a field 716 showing other on-line users. For example, a user could input a question regarding the use of the application, such as "I am having trouble uploading picture receipts from my smartphone—can anyone help". Other users or sponsors of the application could provide feedback in the form of comments in the forum, which could be seen by group members of a social platform. For example, another user of the application may have faced and solved the same problem and the sharing of information and aid can be useful in such a forum. Questions can also be routed directly to sponsors, such as IT, who may be able to better answer questions from a technical perspective, or to an enterprise accounting or administration department, who may be able to better answer application questions from an enterprise policy perspective. The forum may be accessible to all enterprise users, those users who actually use the applications, or any other defined group of users.

Figure 8:
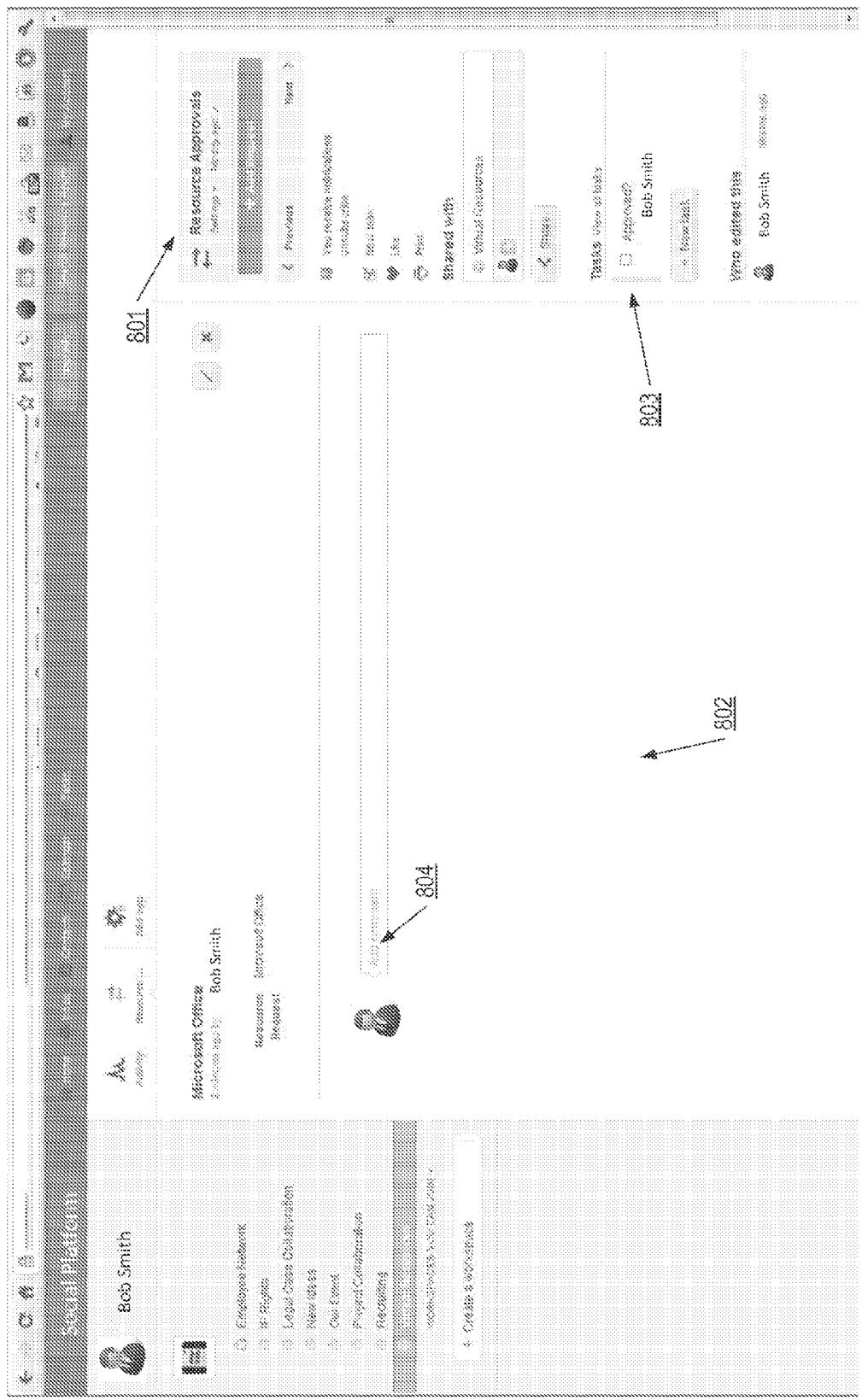

As shown in FIG. 8, the platform 301 can also include a resource approval service 801. A user may view various applications via the application catalog system, although for some desired applications, the user may not be pre-approved. In such a case, the user may request access to a particular application or resource using the resource approval service 801. In some circumstances, access to the application or resource can be granted immediately, based on a user's role in the enterprise or group. In other circumstances, an approvals process may be required wherein a request is routed to an appropriate application sponsor for approval. For example, in some cases, IT may need to approve a request, while in other cases, a manager or other sponsor may approve a request.

The social network platform can also allow resource requests to be passed around and/or acted on by a broader group of people. For example, a list 802 in a system such as platform 301 may list all outstanding requests from a given department, and a commenting and voting system 803 can be used to decide the outcome of the requests. Requests could also be forwarded to others, and commands/comments 804 can be added by potential approvers, and by the person making the requests, such as in an application support forum.

The integration of a resource approval service with an enterprise social network platform makes remote resource approvals less onerous and brings a powerful set of collaboration tools from social networking to bear on the process— rather than the necessarily limited resources of a vertical solution. It also allows the filtering and reporting mechanisms possible in an enterprise social network platform to be used to view outstanding requests or to bulk-approve or deny requests.

In some cases, desired applications may not even be viewable via an application catalog system. The resource approval service and/or application support forum can also deal with these applications. For example, requests for various unauthorized applications may be stored in a social networking forum. The forum allows users to provide detailed information about requested unauthorized applications, but also peruse other outstanding, or handled requests in order to learn what is policy (and why). Requests in such a forum can have the full power of discussion threads and tagging that can be provided by a social network platform and this makes it easier for both users and IT to learn users' needs and how best to serve those needs. For example, groups of users with common needs can 'meet' and discuss the best application to use and then bulk request a site license, rather than IT having to service requests for different applications with similar functionality.

According to another aspect, some public application stores have the concepts of reviews and 'star ratings'. However, within an enterprise context these may make less sense due to the complexity involved, and the conceptual difficulty of giving sensible ratings to software that one uses for work rather than play. A social network platform provides a way to expand a ratings process by giving each application an associated presence within the social network platform. A forum can be provided wherein users can discuss the merits of an application and potential alternatives. Star ratings, reviews, and other evaluations, can be extracted from the social network platform and displayed in connection with applications in the application store.

Like social recommendations above, giving a social presence to an application allows users to ask questions and have others within the community provide support regarding its use and enterprise policies associated with its use. This can provide potential savings over IT-to-user support, and can be used in the restricted and secure environment of an enterprise social network to ensure that details of the applications and their use are kept within a controllable boundary (for example a department, a project team, or the organization as a whole).

An enterprise system may also include support for data services such as file sharing services, e.g., ShareFile® by Citrix Systems Inc. of Ft. Lauderdale, Fla., Box, DropBox, Google Doc, SharePoint, etc. This enables a user to store and access documents remotely and securely. Some aspects may include the ability to share this data with others by sharing files for example with enterprise social network groups. This makes group working and collaboration easier. If users are added or removed from a group, then their access to the documents would dynamically change accordingly.

Using a social network platform makes sharing in general easier. If a user chooses to share a document, for example, then the user may be directly presented with predefined user groups from the enterprise social network platform, rather than simply a list of email addresses or user names. The user may also create a new project workspace for the shared document(s) and add comments, and use other social network platform features, such as receiving notifications when a document is accessed or commented on.

According to aspects, an enterprise system allows a user to select a set of applications pertinent to a user's job from a larger catalog of applications made available to them. The user may wish to share this list of applications with others who are doing the same job—for example if a new employee joins a team, they will often ask a colleague which applications they need, or have IT configure a list for them. Using an enterprise resource sharing custom application, or the platform 301 in general, a user can 'post' a list of applications to the platform so that others can find it and review the list. A user can also direct the list to an individual or group, thereby allowing a manager to provide a new employee with a list of applications on their first day.

According to an aspect, an enterprise system may automatically add any applications (and/or resources) pushed to an enterprise user in this way, and/or may offer a user the ability to add a list found on a social networking site. In some aspects, a manager posting such an application list may include a pre-approval that the recipients may use the applications in the posted list, thereby avoiding the need for a user to ask the manager for approval for any applications that require approvals.

FIG. 2 illustrates a block diagram of an exemplary generic computing device 201 (e.g., a computer server 206a) in another exemplary computing environment 200 that may be used according to one or more illustrative embodiments of the disclosure. According to one or more aspects, generic computing device 201 may be a server 206a in a single-server or multi-server desktop virtualization system (e.g., a cloud system) configured to provide virtual machines for client access devices. The generic computing device 201 may have a processor 103 for controlling overall operation of the server and its associated components, including random access memory (RAM) 205, read-only memory (ROM) 207, input/output (I/O) module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for enabling generic computing device 201 to perform various functions. For example, memory 215 may store software used by the generic computing device 201, such as an operating system 217, application programs 219, and an associated database 221. Alternatively, some or all of the computer executable instructions for generic computing device 201 may be embodied in hardware or firmware (not shown).

The generic computing device 201 may operate in a networked environment supporting connections to one or more remote computers, such as terminals 240 (also referred to as client devices or client machines). The terminals 240 may be personal computers or servers that include many or all of the elements described above with respect to the generic computing device 201. The network connections depicted in FIG. 1 include a local area network (LAN) 225 and a wide area network (WAN) 229, but may also include other networks. When used in a LAN networking environment, the generic computing device 201 may be connected to the LAN 225 through a network interface or adapter 223. When used in a WAN networking environment, the generic computing device 201 may include a modem 227 or other network interface for establishing communications over the WAN 229, such as computer network 230 (e.g., the Internet). It will be appreciated that the network connections shown are illustrative and other means of establishing a communications link between the computers may be used.

Generic computing device 201 and/or terminals 240 may also be mobile terminals (e.g., mobile phones, smartphones, PDAs, notebooks, etc.) including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 2, one or more client devices 240 may be in communication with one or more servers 206a-206n (generally referred to herein as "servers 206" or "server farm 206"). In one embodiment, the computing environment 200 can include an appliance installed between the server(s) and client machine(s) 240. This appliance can manage client/server connections, and in some cases can load balance client connections amongst a plurality of backend servers 106.

The client machine(s) 240 can, in some embodiments, be a single client machine or a single group of client machines, while server farm 106 may include a single server 206a or a single group of servers such as 206a-206n. In one embodiment a single client machine 240 communicates with server farm 206, while in another embodiment a single server 206a communicates with more than one client machine 240. In yet another embodiment, a single client machine 240 communicates with a single server 106a.

A client machine 240 can, in some embodiments, be referenced by any one of the following terms: client machine(s); client(s); client computer(s); client device(s); client computing device(s); local machine; remote machine; client node(s); endpoint(s); or endpoint node(s). The server farm 206, in some embodiments, may be referenced by any one of the following terms: server, server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

The client machine 240 may execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

Still other embodiments include a client device 240 that displays application output generated by an application remotely executing on a server 206a or server farm 206 or other remotely located machine(s). In these embodiments, the client device 240 may execute a virtual machine receiver program or application to display the output in an application window, a browser, or other output window. In one example, the application is a desktop, while in other examples the application is an application that generates a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The servers, in some embodiments, may execute a remote presentation client or other client or program that uses a thin-client or remote-display protocol to capture display output generated by an application executing on a server 206a or server farm 206 and transmits the application display output to a remote client device 140A. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

As mentioned, the computing environment can include more than one server such that the servers 206a-206n are logically grouped together into a server farm 206, for example, in a cloud computing environment. The servers 206a-206n may be geographically dispersed or located proximate to each other. Geographically dispersed servers may, in some embodiments, communicate using a WAN, MAN, or LANs.

In some embodiments, servers 206a-206n may execute a substantially similar type of operating system platform (e.g., WINDOWS NT, manufactured by Microsoft Corp. of Redmond, Wash., UNIX, LINUX, or SNOW LEOPARD.) In other embodiments, a first group of servers may execute a first type of operating system platform, and a second group of servers may execute a second type of operating system platform. The server farm 206, in other embodiments, can include servers that execute different types of operating system platforms.

The server farm 206, in some embodiments, may include any server type, such as: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server executing an active directory; or a server executing an application acceleration program that provides firewall functionality, application functionality, or load balancing functionality. Some embodiments include a first server 206a that receives requests from a client machine 240, forwards the request to a second server 206n, and responds to the request generated by the client machine 240 with a response from the second server 206n. The first server 206a can acquire an enumeration of applications available to the client machine 140 and well as address information associated with an application server 206n hosting an application identified within the enumeration of applications. The first server 206a can then present a response to the client's request using a web interface, and communicate directly with the client 240 to provide the client 240 with access to an identified application.

Client machines 240 may, in some embodiments, be a client node that seeks access to resources provided by a server 206a. In other embodiments, the server 206a may provide clients devices or client nodes with access to hosted resources. The server 206a, in some embodiments, functions as a master node such that it communicates with one or more clients or servers. In some embodiments, the master node can identify and provide address information associated with a server hosting a requested application, to one or more clients or servers. In still other embodiments, the master node can be a server farm 206, a client device 240, a cluster of client nodes, or an appliance.

One or more clients and/or one or more servers can transmit data over a network 230 installed between machines and appliances within the computing environment 200. The network 230 can comprise one or more sub-networks, and can be installed between any combination of the clients 240, servers 206, computing machines and appliances included within the computing environment 200. In some embodiments, the network 230 can be: a local-area network (LAN); a metropolitan area network (MAN); a wide area network (WAN); a primary network 204 comprised of multiple sub-networks located between the client machines and the servers; a primary public network (e.g., the Internet) with a private sub-network; a primary private network with a public sub-network; or a primary private network with a private sub-network. Still further embodiments include a network 230 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network that includes a wireless link where the wireless link can be an infrared channel or satellite band. The network topology of the network 230 can differ within different embodiments, possible network topologies include but are not limited to: a bus network topology; a star network topology; a ring network topology; a repeater-based network topology; or a tiered-star network topology. Additional embodiments may include a network of mobile telephone networks that use a protocol to communicate among mobile devices, where the protocol may include, but is not limited to: AMPS; TDMA; CDMA; GSM; GPRS UMTS; or any other protocol able to transmit data among mobile devices.

FIG. 2 thus illustrates a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Illustrated in FIG. 2A is one embodiment of a computer device 201A configured as a virtualization server in a virtualization environment, for example, a single-server, multi-server, or cloud computing environment. The virtualization server 201A illustrated in FIG. 2 can be deployed as and/or implemented by one or more embodiments of the server 206 illustrated in FIG. 1 or by other known computing devices. Included in virtualization server 201A is a hardware layer that can include one or more physical disks 204A, one or more physical devices 205A, one or more physical processors 208A and a physical memory 216A. In some embodiments, firmware 212A can be stored within a memory element in the physical memory 216A and can be executed by one or more of the physical processors 208A. The virtualization server 201A may further include an operating system 214A that may be stored in a memory element in the physical memory 216A and executed by one or more of the physical processors 208A. Still further, a hypervisor 202A may be stored in a memory element in the physical memory 216A and can be executed by one or more of the physical processors 208A. Executing on one or more of the physical processors 208A may be one or more virtual machines 232A-C (generally 232). Each virtual machine 232 may have a virtual disk 226A-C and a virtual processor 228A-C. In some embodiments, a first virtual machine 232A may execute, on a virtual processor 228A, a control program 220A that includes a tools stack 224A. In other embodiments, one or more virtual machines 232B-C can executed, on a virtual processor 228B-C, a guest operating system 230A-B.

Further referring to FIG. 2A, and in more detail, the virtualization server 201A may include a hardware layer 210A with one or more pieces of hardware that communicate with the virtualization server 201A. In some embodiments, the hardware layer 210A can include one or more physical disks 204A, one or more physical devices 205A, one or more physical processors 208A, and one or more memory 216A. Physical components 204A, 205A, 208A, and 216A may include, for example, any of the components described above in FIGS. 1-2. For instance, physical disks 204A may include permanent memory storage, temporary memory storage, disk drives (e.g. optical, floppy, tape), hard disks, external hard drives, flash memory, network-attached storage, a storage-area network, or any other storage repository that the virtualization server 201A can access. Physical devices 205A may include any device included in the virtualization server 201A and/or any combination of devices included in the virtualization server 201 and external devices that communicate with the virtualization server 201A. A physical device 205A may be, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with the virtualization server 201A. The physical memory 216A in the hardware layer 210A may include any type of memory. The physical memory 216A may store data, and in some embodiments may store one or more programs, or set of executable instructions. FIG. 2A illustrates an embodiment where firmware 212A is stored within the physical memory 216A of the virtualization server 201A. Programs or executable instructions stored in the physical memory 216A can be executed by the one or more processors 208A of the virtualization server 201A.

Virtualization server 201A may also include a hypervisor 202A. In some embodiments, hypervisor 202A may be a program executed by processors 208A on the virtualization server 201A to create and manage any number of virtual machines 232A. The hypervisor 202A can be referred to as a virtual machine monitor, or platform virtualization software. In some embodiments, a hypervisor 202A can be any combination of executable instructions and hardware that monitors virtual machines executing on a computing machine. Hypervisor 202A may be Type 2 hypervisor, or a hypervisor that executes within an operating system 214A executing on the virtualization server 201A. A Type 2 hypervisor, in some embodiments, executes within an operating system 214A environment and virtual machines execute at a level above the hypervisor. In many embodiments, the Type 2 hypervisor executes within the context of a user's operating system such that the Type 2 hypervisor interacts with the user's operating system. In other embodiments, one or more virtualization servers 201A in a virtualization environment may include a Type 1 hypervisor (Not Shown). A Type 1 hypervisor may execute on the virtualization server 201A by directly accessing the hardware and resources within the hardware layer 210A. That is, while a Type 2 hypervisor 202A accesses system resources through a host operating system 214A, a Type 1 hypervisor may directly access all system resources without needing a host operating system 214A. A Type 1 hypervisor may execute directly on one or more physical processors of 208A the virtualization server 201A, and may include program data stored in the physical memory 216A.

The hypervisor 202A, in some embodiments, can provide virtual resources to operating systems 230A or control programs 220A executing on virtual machines 232A in any manner that simulates the operating systems 230A or control programs 220A having direct access to system resources. System resources can include: physical devices 205A; physical disks; physical processors; physical memory 216A and any other component included in the virtualization server 201A hardware layer 210A. In these embodiments, the hypervisor 202A may be used to emulate virtual hardware, partition physical hardware, virtualize physical hardware, or execute virtual machines that provide access to computing environments. In still other embodiments, the hypervisor 202A controls processor scheduling and memory partitioning for a virtual machine 232 executing on the virtualization server 201A. Hypervisor 202A may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a virtualization server 201A executes a hypervisor 202A that creates a virtual machine platform on which guest operating systems may execute. In these embodiments, the virtualization server 201A can be referred to as a host server. An example of such a virtualization server is the XEN SERVER provided by Citrix Systems, Inc., of Fort Lauderdale, Fla.

The hypervisor 202A may create one or more virtual machines 232B-C (generally 232) in which guest operating systems 230A execute. In some embodiments, the hypervisor 202 may load a virtual machine image to create a virtual machine 232A. In other embodiments, the hypervisor 202A may executes a guest operating system 230A within the virtual machine 232A. In still other embodiments, the virtual machine 232A may execute the guest operating system 230A.

In addition to creating virtual machines 232A, the hypervisor 202A may control the execution of at least one virtual machine 232A. In other embodiments, the hypervisor 202A may presents at least one virtual machine 232A with an abstraction of at least one hardware resource provided by the virtualization server 201A (e.g., any hardware resource available within the hardware layer 210A). In other embodiments, the hypervisor 202A may control the manner in which virtual machines 232A access the physical processors 208A available in the virtualization server 201A. Controlling access to the physical processors 208A may include determining whether a virtual machine 232A should have access to a processor 208A, and how physical processor capabilities are presented to the virtual machine 232A.

As shown in the example of FIG. 2, the virtualization server 201A may host or execute one or more virtual machines 232A. A virtual machine 232A is a set of executable instructions that, when executed by a processor 208A, imitate the operation of a physical computer such that the virtual machine 232A can execute programs and processes much like a physical computing device. While FIG. 2A illustrates an embodiment where a virtualization server 201A hosts three virtual machines 232A, in other embodiments the virtualization server 201A can host any number of virtual machines 232A. The hypervisor 202A, in some embodiments, provides each virtual machine 232 with a unique virtual view of the physical hardware, memory, processor and other system resources available to that virtual machine 232. In some embodiments, the unique virtual view can be based on any of the following: virtual machine permissions; application of a policy engine to one or more virtual machine identifiers; the user accessing a virtual machine; the applications executing on a virtual machine; networks accessed by a virtual machine; or any other similar criteria. For instance, the hypervisor 202A may create one or more unsecure virtual machines 232 and one or more secure virtual machines 232. Unsecure virtual machines 232 may be prevented from accessing resources, hardware, memory locations, and programs that secure virtual machines 232 may be permitted to access. In other embodiments, the hypervisor 202A may provide each virtual machine 232 with a substantially similar virtual view of the physical hardware, memory, processor and other system resources available to the virtual machines 232.

Each virtual machine 232 may include a virtual disk 226A-C (generally 226) and a virtual processor 228A-C (generally 228.) The virtual disk 226A, in some embodiments, is a virtualized view of one or more physical disks 204A of the virtualization server 201A, or a portion of one or more physical disks 204A of the virtualization server 201A. The virtualized view of the physical disks 204A can be generated, provided and managed by the hypervisor 202A. In some embodiments, the hypervisor 202A provides each virtual machine 232A with a unique view of the physical disks 204A. Thus, in these embodiments, the virtual disk 226A included in each virtual machine 232 can be unique when compared with the other virtual disks 226A.

A virtual processor 228A can be a virtualized view of one or more physical processors 208A of the virtualization server 201A. In some embodiments, the virtualized view of the physical processors 208A can be generated, provided and managed by the hypervisor 202A. In some embodiments, the virtual processor 228A has substantially all of the same characteristics of at least one physical processor 208A. In other embodiments, the virtual processor 208A provides a modified view of the physical processors 208A such that at least some of the characteristics of the virtual processor 228A are different than the characteristics of the corresponding physical processor 208A.

FIG. 9 illustrates a system architecture that may be used according to one or more aspects described herein, to provide an integrated unified view of remote applications and resources. According to an aspect, a virtual machine receiver 901 performs integration of various services and presents those integrated services to the user in a new and exciting way. Receiver 901 may communicate with a single sign on (SSO) service 903 and then obtain information from various resources based on the SSO providing access to disparate services.

Receiver 901 may communicate with a social platform 905, e.g., platform 301, SSO service 903 (e.g., Citrix Cloud Gateway), collaboration and/or audio/video communication services 906 (e.g., GOTOMEETING® or a unified communications system), data sharing service 907 (e.g., Share-File®), corporate databases 909, hosted resources 911, etc.

Upon logging in to the enterprise network, and thereby gaining access to file/data sharing service, corporate directories, active directories, network shares, corporate social intranet (e.g., Podio®), and other services, receiver 901 may communicate with the other services 905-911 to obtain various information to present to a user through the virtual machine receiver in a single integrated display or user interface, as is shown in FIG. 10.

Receiver may instruct platform 905 to store shared file information from service 907. Each service may or may not know how to use the data that is stored, but may learn how to use data upon logging in to SSO 903. Aggregation by receiver 901 may be based on or subject to information learned from corporate databases, e.g., based on an organizational chart and whether one employee is hierarchically above, below, lateral, or in an entirely separate division of a company than another employee. Updates received from employees higher up in the organizational chart may be displayed with more prominence than updates received from employees lower in the organizational chart. Updates from employees in a different branch of the organization chart from a current user may be displayed with less prominence than updates from employees within the same branch of the organizational chart as the current user. As companies grow in size, corporate structure gains relevance to determining which updates to display with various levels of prominence.

FIG. 11 illustrates a first layout for a user interface that receiver 901 may present to a user through any computing device, e.g., a mobile or tablet device. UI may include integrated displays for recent activity updates, relevant files from a file sharing service (e.g., ShareFile®), relevant remote resources, upcoming calendar items, alerts, and relevant other users 1013. FIG. 11 also illustrates a callout box presented by receiver 901 providing more information when a user selects a particular individual in list 1013. A callout box presented by receiver 901 can provide more information, e.g., preview, metadata, etc., when a user selects a particular file.

Receiver 901 may use a news feed 915, contextual linkage 917, and support integration to further alter and enhance an integrated display for a user using a virtual machine receiver. For example, support integration 913 may collect and integrate support information usable by a help desk, e.g., type of machine, version of receiver, applications running, workspace, authentication, etc., and send this information directly to a support desk to help identify problems, rather than the user reading the information from a screen. For example, suppose a user is connected to an application hosted on server 17 (FIG. 9), but the user is having trouble connecting to the application. The user may select a support link, and GoToAssist® may launch. The user can allow GoToAssist to gather information automatically and upload that information to the help desk, including all information about what is running in the virtual machine receiver at the time, including servers connected to, errors received, etc. The help desk can import the received information automatically into desktop studio tool that provides support for server side of XenDesktop® or other virtual machine service. With one click you have sent relevant information to the help desk, and the help desk can see any errors provided by Server 17.

Using one or more aspects described herein, receiver 901 incorporates data from a plurality of sources to provide an intelligent aggregation service of relevant work activities through which a user can execute contextual workflows in a seamless manner. Receiver 901 provides a smart work context, work activity ticker, rapid access to applications, people, and data, and may include embedded micro-apps.

Receiver 901 may perform aggregation and integration described above, or such aspects may be performed by one or more other devices, services, or technologies. Any device or service may perform the aggregation/integration provided there is access to a single-sign on service, e.g., Cloud Gateway, that in turn identifies and grants access to sources being integrated for display together on a common user interface. The SSO may provide a directory of services, so that receiver 901 (or other service performing integration) learns which services to communicate with to obtain the desired data. Aggregation/integration may instead be performed by the platform 301, e.g., by Podio®, or by other services and/or devices.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. Modifications may be made by those skilled in the art, particularly in light of the foregoing teachings. For example, each of the elements of the aforementioned embodiments may be utilized alone or in combination or sub-combination with elements of the other embodiments. It will also be appreciated and understood that modifications may be made without departing from the spirit and scope of the following claims.

While the invention has been particularly shown and described with reference to specific preferred embodiments, it should be understood by those skilled in the art that various changes in form and detail may be made therein departing from the spirit and scope of the invention as defined by the appended claims. While various exemplary and non-limiting embodiments are described with reference to BYOD, the disclosure is not so limited. Rather, exemplary embodiments are broadly described herein as encompassing any and all situations regardless of device ownership. For example, an organization may provide employees with devices that they allow to be used for a mix of work and personal tasks. The device may even be a pure work-only device. Further, various exemplary and non-limiting embodiments are described wherein authorized applications of computing devices are provided with secure access to enterprise networks, servers, and resources. Such enterprise servers and resources may be located in a typical enterprise data center, in a partner data center, in a public or private cloud, or in any combination of these or other locations. Further, different authorized applications on a device may use different micro-VPNs to simultaneously access different secure data centers/clouds or other locations.

The invention claimed is:

1. A computing device comprising:
at least one processor; and
at least one memory for storing computer executable instructions, wherein execution of the executable instructions by the at least one processor causes the computing device to perform:
   determining, by the at least one processor, information identifying one or more types of user roles within an enterprise;
   providing, by the at least one processor, at least one social networking feature via an enterprise social platform to one or more user groups, wherein each user group is associated with one of the identified types of user roles within the enterprise and comprises one or more enterprise users, wherein the at least one social networking feature is associated with an enterprise application store;

generating, by the at least one processor, a catalog of enterprise applications that are available for selection by the one or more enterprise users;

receiving, by the at least one processor from at least one client device from at least one member of the one or more user groups via the at least one social networking feature, application evaluation information evaluating one or more enterprise applications available for selection via the enterprise application store;

determining, by the at least one processor and based on the application evaluation information, a set of one or more recommended enterprise applications for each of the types of user roles within the enterprise, wherein each of the one or more recommended enterprise applications is associated with at least one sponsor service based on the corresponding type of user role within the enterprise;

providing, by the at least one processor, a first one of the sets of one or more recommended enterprise applications that is associated with a first type of user role within the enterprise to a first enterprise user associated with the first type of user role within the enterprise and a second one of the sets of one or more recommended enterprise applications that is associated with a second type of user role within the enterprise to a second enterprise user associated with the second type of user role within the enterprise, wherein the first set and the second set comprise a common recommended enterprise application;

responsive to a selection, by the first enterprise user, of the common recommended enterprise application from the first set of one or more recommended enterprise applications, providing a first sponsor service associated with the common recommended enterprise application for the first type of user role within the enterprise; and responsive to a selection, by the second enterprise user, of the common recommended enterprise application from the second set of one or more recommended enterprise applications, providing a second sponsor service associated with the common recommended enterprise application for the second type of user role within the enterprise, wherein the first sponsor service is not provided, and wherein the second sponsor service is different from the first sponsor service.

2. The computing device of claim 1, wherein the at least one social networking feature comprises one or more of the following: a comment feature, an email feature, a chat feature, an instant messaging feature, an audio conferencing feature, a video conferencing feature, a file sharing feature, a media sharing feature, a document sharing feature, a file handling feature, a rating feature, a recommendation feature, a help feature, an approval request feature, a how-to feature, and an evaluation feature.

3. The computing device of claim 1, wherein the types of user roles within the enterprise are identified based on one or more of the following: an organization chart, an employee classification, an enterprise role, an enterprise department classification, a project team membership, and an enterprise grouping based upon a closeness metric.

4. The computing device of claim 1, wherein execution of the executable instructions by the at least one processor further causes the computing device to perform providing a customized list of available enterprise applications to a user based on an associated type of user role within the enterprise.

5. The computing device of claim 1, wherein the enterprise application store is a publicly accessible application store.

6. The computing device of claim 1, wherein the enterprise application store includes a private enterprise store with downloadable applications.

7. The computing device of claim 1, wherein execution of the executable instructions by the at least one processor further causes the computing device to perform providing a customized user interface for user interaction in an application support forum.

8. The computing device of claim 1, wherein execution of the executable instructions by the at least one processor further causes the computing device to perform determining whether user authorization for accessing an application is required based on an associated type of user role within the enterprise.

9. The computing device of claim 8, wherein execution of the executable instructions by the at least one processor further causes the computing device to perform initiating an on-line approval process if a recommended enterprise application is not pre-approved for a user.

10. The computing device of claim 1, wherein execution of the executable instructions by the at least one processor further causes the computing device to perform:

associating one or more of the enterprise applications with a corresponding sponsor service and a corresponding sponsor, wherein the corresponding sponsor service is a recommendation service, an application help service, or an application approval service, wherein the corresponding sponsor is a group based on the identified type of user role, and wherein the at least one processor provides the user associated with the first type of user role within the enterprise with at least one sponsor based on an enterprise application selected by the user associated with the first type of user role within the enterprise.

11. The computing device of claim 1, further wherein execution of the executable instructions by the at least one processor further causes the computing device to perform providing an application wrapper for at least one of the enterprise applications, the application wrapper being configured to secure execution of the enterprise application on a mobile device of an enterprise user.

12. The computing device of claim 11, wherein security of the application wrapper is based on the type of user role within the enterprise associated with the user of the mobile device in the enterprise.

13. The computing device of claim 1, wherein the enterprise application store is accessible by a secure, single sign-on facility that includes security based on the type of user role within the enterprise associated with a user.

14. A method for providing application support to enterprise users, the method comprising:

determining, by the at least one processor, information identifying one or more types of user roles within an enterprise;

providing, by the at least one processor, at least one social networking feature via an enterprise social platform to one or more user groups, wherein each user group is associated with one of the identified types of user roles within the enterprise and comprises one or more enterprise users, wherein the at least one social networking feature is associated with an enterprise application store;

generating, by the at least one processor, a catalog of enterprise applications that are available for selection by the one or more enterprise users;

receiving, by the at least one processor from at least one client device from at least one member of the one or more user groups via the at least one social networking feature, application evaluation information evaluating one or more enterprise applications available for selection via the enterprise application store;

determining, by the at least one processor and based on the application evaluation information, a set of one or more recommended enterprise applications for each of the types of user roles within the enterprise, wherein each of the one or more recommended enterprise applications is associated with at least one sponsor service based on the corresponding type of user role within the enterprise;

providing, by the at least one processor, a first one of the sets of one or more recommended enterprise applications that is associated with a first type of user role within the enterprise to a first enterprise user associated with the first type of user role within the enterprise and a second one of the sets of one or more recommended enterprise applications that is associated with a second type of user role within the enterprise to a second enterprise user associated with the second type of user role within the enterprise, wherein the first set and the second set comprise a common recommended enterprise application;

responsive to a selection, by the first enterprise user, of the common recommended enterprise application from the first set of one or more recommended enterprise applications, providing a first sponsor service associated with the common recommended enterprise application for the first type of user role within the enterprise; and responsive to a selection, by the second enterprise user, of the common recommended enterprise application from the second set of one or more recommended enterprise applications, providing a second sponsor service associated with the common recommended enterprise application for the second type of user role within the enterprise, wherein the first sponsor service is not provided, and wherein the second sponsor service is different from the first sponsor service.

15. The method of claim 14, further comprising providing a customized list of available enterprise applications to a user based on an associated type of user role within the enterprise.

16. The method of claim 14, further comprising providing a customized user interface for user interaction in an application support forum.

17. The method of claim 14, further comprising determining whether user authorization for accessing an application is required based on an associated type of user role within the enterprise associated with a user.

18. The method of claim 17, further comprising initiating an approval process if an application is not pre-approved for a user.

19. The method of claim 14, further comprising downloading an enterprise application from the enterprise application store.

20. The method of claim 19, further comprising providing an application wrapper for the downloaded enterprise application, the application wrapper being configured to secure execution of the enterprise application on a mobile device of an enterprise user.

21. The computing device of claim 6, wherein the identified types of user roles comprise enterprise project team members, enterprise recruiting team members, or enterprise event planning team members.

22. The computing device of claim 1, wherein the types of user roles are identified based on a degree of user activity associated with an enterprise group or an enterprise project.

23. The computing device of claim 1,
wherein the first set of one or more recommended enterprise applications associated with the first type of user role within the enterprise and the second set of one or more recommended enterprise applications associated with the second type of user role within the enterprise each comprise at least one differing recommended enterprise application.

24. The method of claim 14,
wherein the first set of one or more recommended enterprise applications associated with the first type of user role within the enterprise and the second set of one or more recommended enterprise applications associated with the second type of user role within the enterprise each comprise at least one differing recommended enterprise application.

25. One or more non-transitory computer-readable storage media having computer-readable instructions stored thereon, that when executed by at least one processor, cause the at least one processor to perform:

determining, by the at least one processor, information identifying one or more types of user roles within an enterprise;

providing, by the at least one processor, at least one social networking feature via an enterprise social platform to one or more user groups, wherein each user group is associated with one of the identified types of user roles within the enterprise and comprises one or more enterprise users, wherein the at least one social networking feature is associated with an enterprise application store;

generating, by the at least one processor, a catalog of enterprise applications that are available for selection by the one or more enterprise users;

receiving, by the at least one processor from at least one client device from at least one member of the one or more user groups via the at least one social networking feature, application evaluation information evaluating one or more enterprise applications available for selection via the enterprise application store;

determining, by the at least one processor and based on the application evaluation information, a set of one or more recommended enterprise applications for each of the types of user roles within the enterprise, wherein each of the one or more recommended enterprise applications is associated with at least one sponsor service based on the corresponding type of user role within the enterprise;

providing, by the at least one processor, a first one of the sets of one or more recommended enterprise applications that is associated with a first type of user role within the enterprise to a first enterprise user associated with the first type of user role within the enterprise and a second one of the sets of one or more recommended enterprise applications that is associated with a second type of user role within the enterprise to a second enterprise user associated with the second type of user role within the enterprise, wherein the first set and the second set comprise a common recommended enterprise application;

responsive to a selection, by the first enterprise user, of the common recommended enterprise application from the first set of one or more recommended enterprise applications, providing a first sponsor service associated with the common recommended enterprise application for the first type of user role within the enterprise; and responsive to a selection, by the second enterprise user, of the common recommended enterprise application from the second set of one or more recommended enterprise applications, providing a second sponsor service associated with the common recommended enterprise application for the second type of user role within the enterprise, wherein the first sponsor service is not provided, and wherein the second sponsor service is different from the first sponsor service.

26. The computing device of claim 1, wherein execution of the executable instructions by the at least one processor further causes the computing device to perform:
receiving feedback associated with the first sponsor service or feedback associated with the second sponsor service;
modifying the set of the one or more recommended applications for the first type of user role or the set of the one or more recommended applications for the second type of user role based on the corresponding feedback, wherein the corresponding modified set comprises a different combination of recommended applications than the corresponding unmodified set; and
providing one or more of the modified sets.

27. The method claim 14, further comprising:
receiving feedback associated with the first sponsor service or feedback associated with the second sponsor service;
modifying the set of the one or more recommended applications for the first type of user role or the set of the one or more recommended applications for the second type of user role based on the corresponding feedback, wherein the corresponding modified set comprises a different combination of recommended applications than the corresponding unmodified set; and
providing one or more of the modified sets.

* * * * *